United States Patent
Grilli

(10) Patent No.: US 8,446,820 B2
(45) Date of Patent: May 21, 2013

(54) CHANGES TO ACCESS PROCEDURE FOR ASC 0 FOR UMTS

(75) Inventor: Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 12/417,031

(22) Filed: Apr. 2, 2009

(65) Prior Publication Data

US 2010/0226248 A1 Sep. 9, 2010

Related U.S. Application Data

(60) Provisional application No. 61/157,860, filed on Mar. 5, 2009.

(51) Int. Cl.
*H04L 1/00* (2006.01)
*H04L 12/56* (2006.01)
*H04W 28/18* (2009.01)

(52) U.S. Cl.
CPC .............. *H04L 47/10* (2013.01); *H04W 28/18* (2013.01)
USPC ........... 370/230; 370/252; 370/329; 370/444; 455/452.2

(58) Field of Classification Search
USPC ................. 370/229–235, 252–253, 329–338, 370/431, 437, 442–445; 455/450, 451, 452.1, 455/452.2, 453
See application file for complete search history.

(56) References Cited

U.S. PATENT DOCUMENTS

2004/0032877 A1* 2/2004 Chuah et al. .................. 370/444

FOREIGN PATENT DOCUMENTS

| EP | 1186189 A1 | 3/2002 |
|----|------------|--------|
| WO | WO2004064272 A1 | 7/2004 |
| WO | WO2007029977 A1 | 3/2007 |

OTHER PUBLICATIONS

3GPP TS 25.331 V4.1.0, 3rd Generation Parnership Project; Technical Specification Group Radio Access Network; RRC Protocol Specification (Release 4), Jun. 2001, p. 187-188.*
International search report—PCT/US2010/026158, International Search Authority—European Patent Office—May 28, 2010.
"Universal Mobile Telecommunications System (UMTS); Medium Access Control (MAC) protocol specification (3GPP TS 25.321 version 7.9.0 Release 7); ETSI TS 125 321" ETSI Standard, European Telecommunications Standards Institute (ETSI), Sophia Antipolis Cedex, France, vol. 3-R2, No. V7.9.0, Jul. 1, 2008, XP014042116 cited in the application paragraph [11.2.1] paragraph [11.2.2] paragraph [11.2.3].

(Continued)

*Primary Examiner* — Pao Sinkantarakorn
(74) *Attorney, Agent, or Firm* — Charles Chesney

(57) ABSTRACT

According to one aspect, a method that includes some of the teachings of the present subject technology reduces congestion in a communications network. The method includes, inter alia, letting a persistence value be a function of N, even when ASC=0, and also a function of a constant the emergency services access parameter W, such that the persistence value $P_0(N)$ ranges between $P_1(N)$ and 1 when the emergency services access parameter W ranges from a first value (e.g. 0) to a second value (e.g. 1), where $P(N)=2^{-(N-1)}$ and where N is transmitted in a system information message. A comparator allows a user to access the communications network only if a random/pseudorandom number is less than the persistence value. Other aspects, such as a computer program product, also reduce congestion in a communications network.

29 Claims, 8 Drawing Sheets

OTHER PUBLICATIONS

"Universal Mobile Telecommunications Systems (UMTS); Radio Resource Control (RRC); Protocol specification (3GPP TS 25.331 version 7.9.0 Release 7); ETSI TS 125 331" ETSI Standard, European Telecommunications Standards Institute (ETSI), Sophia Antipolis Cedex, France, vol. 3-R2, No. V7.9.0, Jul. 1, 2008, XP014042122 cited in the application paragraph [8.5.12]paragraph [8.5.17].

Written Opinion—PCT/US2010/026158—International Search Authority European Patent Office—May 28, 2010.

\* cited by examiner

CHANGES TO ACCESS PROCEDURE FOR ASC 0 FOR UMTS

CLAIM OF PRIORITY UNDER 35 U.S.C. §119

The present Application for Patent claims priority to Provisional Application No. 61/157,860 entitled "Changes to access procedure for ASC 0 for UMTS" filed Mar. 5, 2009, and assigned to the assignee hereof and hereby expressly incorporated by reference herein.

BACKGROUND

1. Field

The present subject technology relates to telecommunications and more particularly to controlling or administering access to a telecommunications channel for a subscriber station.

2. Background

This Background and discussion of related art is presented with benefit of hindsight and knowledge of the inventive concepts discussed throughout this document, and therefore none of this discussion or any of the referenced mentioned herein is admitted prior art.

Universal Mobile Telecommunications System (UMTS) is one of the third generation (3G) mobile telephone technologies (or 3rd Generation Wireless Mobile Communication Technology). A UMTS network consists of 1) a Core Network (CN), 2) a UMTS Terrestrial Radio Access Network (UTRAN) and 3) User Equipment (UE, also known as a "mobile" or "mobile unit"), also known as a mobile station. The core network provides routing, switching, and transit for user traffic. A Global System for Mobile Communications (GSM) network with General Packet Radio Service (GPRS) is the basic core network architecture that UMTS is based on. The UTRAN provides the air interface access method for User Equipment. A base station is referred to as Node B and control equipment for Node Bs is called a Radio Network Controller (RNC). For an air interface, UMTS most commonly uses a wideband spread-spectrum mobile air interface known as Wideband Code Division Multiple Access (or W-CDMA). W-CDMA uses a direct sequence code division multiple access signaling method (or CDMA) to separate users.

A UMTS Terrestrial Radio Access Network (UTRAN) is a collective term for the Node Bs (or base stations) and the control equipment for the Node Bs (or RNC) it contains which make up the UMTS radio access network. This is a 3G communications network which can carry both real-time circuit switched and IP based packet switched traffic types. The RNC provides control functionalities for one or more Node Bs. Connectivity is provided between the UE (user equipment) and the CN (core network) by the UTRAN.

The UTRAN is connected internally or externally to other functional entities by four interfaces: Iu, Uu, Iub and Iur. The UTRAN is attached to a GSM core network via an external interface called Iu. A radio network controller (RNC) supports this interface. In addition, RNC manages a set of base stations called Node Bs through interfaces labeled Iub. The Iur interface connects two RNCs with each other. The UTRAN is largely autonomous from the core network since the RNCs are interconnected by the Iur interface. FIG. 8 discloses a communication system which uses the RNC, the Node Bs and the Iu and Uu interfaces. The Uu is also external and connects the Node B with the UE, while the Iub is an internal interface connecting the RNC with the Node B.

The RNC fills multiple roles. First, it may control the admission of new mobiles or services attempting to use the Node B. Second, from the Node B, i.e. base station, point of view, the RNC is a controlling RNC. Controlling admission ensures that mobiles are allocated radio resources (bandwidth and signal/noise ratio) up to what the network has available. It is where Node B's Iub interface terminates. From the UE, i.e. mobile, point of view, the RNC acts as a serving RNC in which it terminates the mobile's link layer communications. From the core network point of view, the serving RNC terminates the Iu for the UE. The serving RNC also controls the admission of new mobiles or services attempting to use the core network over its Iu interface.

In the UMTS system, universal terrestrial radio access (UTRA) frequency division duplex (FDD) channels and UTRA time division duplex (TDD) channels may be used to communicate data. The communication link through which the user equipment sends signals to the Node B is called a uplink.

Users may attempt to access a telecommunications network, such as a cellular network, by using a cellular telephone or other user equipment to place a call. For example, a user may enter a telephone number into the mobile unit and press a "Send" key. One of the first steps in handling the call is to determine whether the call is being placed to emergency services, or is otherwise to be assigned a special "access services code" or "access service class" (interchangeable terms that are both abbreviated "ASC"). If the attempted access appears to be directed to emergency services, such as a call to "911" in the United States or a call to "112" in Europe, then the user equipment may determine an ASC=0, which indicates that the call is to be given the highest priority. Generally, if the call is not being directed to emergency services and is not being placed by a member of the emergency services, then the user equipment assigns the call an ASC=1, although in some situations other access service codes may be used. For example, the 3GPP specification allows a cellular operator to allow user equipment to determine an ASC of any integer value from zero to seven, although most cellular operators implement their networks using only ASC=0 and ASC=1.

If ASC=0, then the user equipment immediately attempts to pass the call through to the communications network. If ASC=1, however, then the user equipment calculates a "persistence" value based on previous base station transmissions, and iterates through a loop. Each iteration, the user equipment generates a random number and only allows the access attempt if the random number is less than the persistence value. The persistence value may be regarded as a probability that the user equipment will connect to the network during each iteration.

By providing immediate access to all access attempts for which ASC=0, the cellular network can give priority to emergency calls, such as call to 911 in the United States. Emergency calls may be said to have a 100% persistence value, in that the user equipment will certainly initiate the access attempt immediately. When only a few users are placing calls to emergency services, this technique works well. However, if too many users attempt to call emergency services simultaneously, congestion may result in collisions. For example, if a large-scale disaster or similar emergency occurs, very large numbers of people may attempt to place calls to emergency services. Since all such calls are given immediate access, network congestion will result, and none of the calls will gain access to the cellular network. Without any randomization there is the potential for a high level of collisions among mobile stations trying to place emergency calls all at the same time. If all of the users retry their calls after failing to receive an acknowledgement, another collision will result, and none of the users will gain access to the telecommunications network; all calls will again attempt to gain access to the cellular network, and all will again fail. The situation will result in repeated attempts indefinitely, with no success.

DETAILED DESCRIPTION

Telecommunications networks handle emergency calls and non-emergency calls differently, and assign such calls to different access service classes (ASCs). Calls made to emergency services, and in some cases calls made by emergency response personnel, are assigned an ASC value of 0, and may be described as ASC=0. Other calls are assigned to other access service classes, such as ASC=1, ASC=2, etc., up to ASC=7, although most telecommunications networks are configured more simply such that all non-emergency calls are assigned ASC=1.

Calls that have ASC=0 are given priority use of the telecommunications network over all other calls. If many access service classes are used, then calls that have ASC=0 are given priority use over the network over other non-emergency calls. Traditionally, i.e. in accordance with 3GPP specification TS 25.214, 3GPP specification TS 25.321, and 3GPP specification TS 25.331, calls that have ASC=0 are given a 100% likelihood of being able to access the telecommunications network. Other calls are given a probability P of being able to use the telecommunications network during any transmission time interval (TTI), where the TTI delimits possible attempts to transmit a signal on the Random Access Channel (RACH). Calls that fail the persistence check during a particular TTI automatically retry during an immediately subsequent TTI. A telecommunications network may be configured with TTIs of 10 milliseconds or 20 milliseconds on the RACH, according the aforementioned standards, but most telecommunications networks are configured with TTIs of 10 milliseconds on the RACH.

ASC=0

Figure 1:
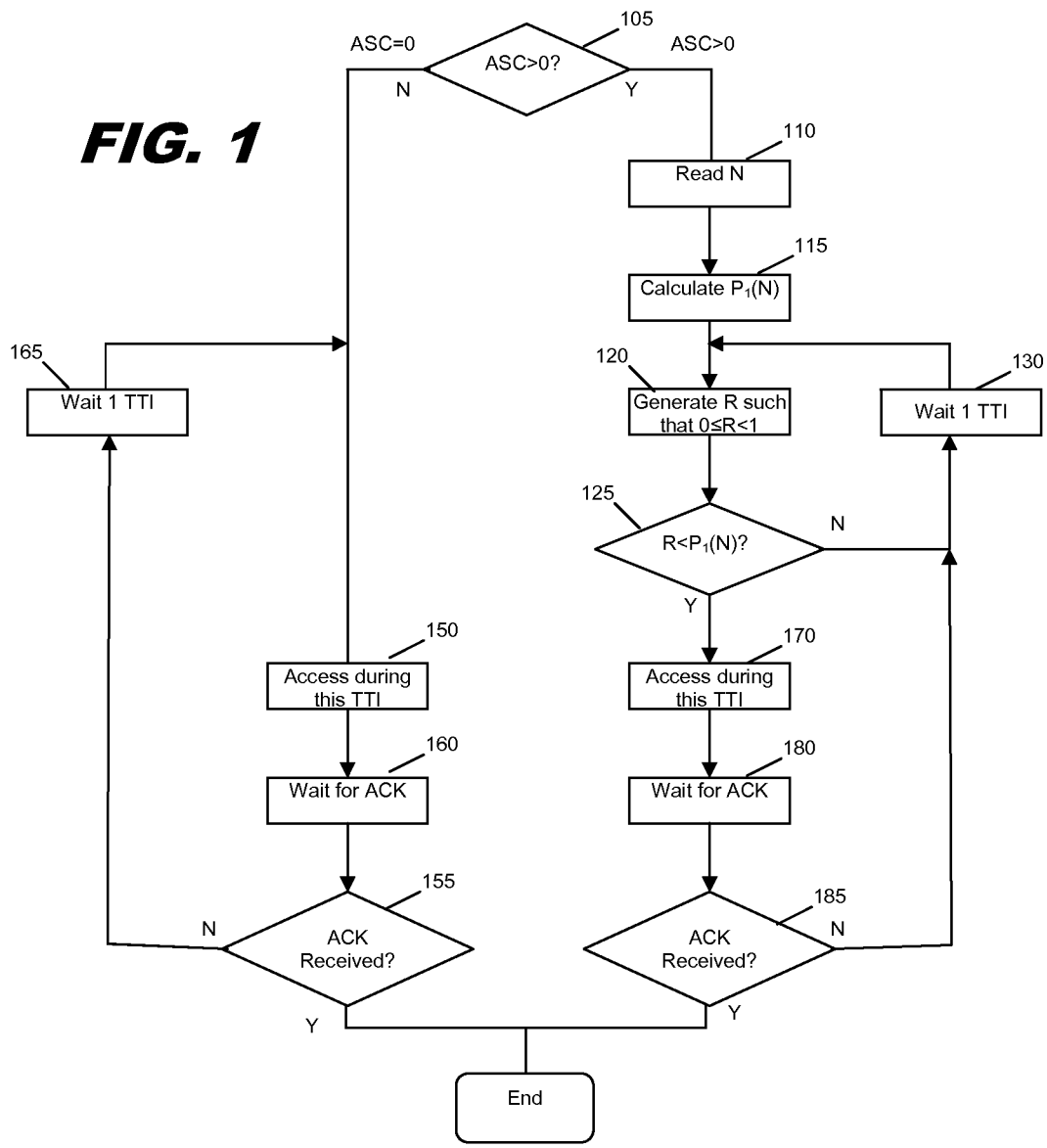
FIG. 1 is a flowchart of a traditional method of gaining access to a telecommunications network, in accordance with the aforementioned specifications.

FIG. 1 is a flowchart of a traditional method of gaining access to a telecommunications network, in accordance with the aforementioned specifications. At program point 105, the user equipment determines whether the access attempt (such as an attempt to place a telephone call) should be given an ASC=0 or some other ASC, which for simplicity of presentation is represented as ASC=1. Specifically, the user equipment determines whether an access attempt is directed to emergency services. If the user equipment is located in the United States and the user equipment determines that the access attempt is a call to 911, or is otherwise directed to emergency services, then the user equipment may assign ASC=0 to the call. Other calls may also be assigned an ASC=0. For example, some automated emergency equipment, such hazardous materials detectors on emergency vehicles or similar equipment, may be preconfigured to initiate call with an ASC=0.

If the user equipment determines that the access attempt has an ASC=0, then control proceeds to program point 150, and the user equipment is given access to the network, and a signal is transmitted on the RACH. At some point later in time represented by program point 160, the user equipment waits for an acknowledgement ("ACK") on an AICH ("Acknowledge Indication Channel"), granting access to the communications network. This waiting time includes any time needed to run a backoff timer in case a negative acknowledgement ("NACK") is received on the AICH. The acknowledgment arrives, if at all, at a deterministic predetermined time relative to the access attempt. If (as determined at program point 155) the ACK does not arrive at the appropriate time, then control passes to program point 165 to wait until a TTI that immediately follows the TTI in which the ACK was expected, or in which the backoff timer expires (i.e., a next TTI), and then returns to program point 150 to try during that next TTI.

It may be said that there is a probability of 100% of reaching program point 150 and accessing the communications network, when ASC=0. Such a probability may be described as a "persistence value" that, in the case of ASC=0, is 100%. It may be said that $P_0(N)=100\%$, where P represents the persistence value and the subscript "0" indicates that ASC=0.

ASC>0

If program point 105 determines that the call is not directed to emergency services, i.e., if ASC>0, then the user equipment engages in additional procedures. At program point 110, the user equipment reads a value of N that has been received from a previous transmission from the base station and stored within the user equipment. At program point 115, the user equipment calculates $P_1(N)$ based on the value of N. A formula for calculating $P_1(N)$, where the subscript 1 represents the ASC=1, is provided in section 8.5.12 of 3GPP specification TS 25.331 as $P_1(N)=2^{-(N-1)}$. This formula may be written as $$P_1(N) = \frac{1}{2^{(N-1)}}.$$

If access service classes beyond ASC=0 and ASC=1 are used, scaling factors may also be used to calculate $P_{ASC}(N)$, although for present purposes such cases are treated as ASC=1.

As can be seen from this formula, if the base station has transmitted a value of N that is equal to 1, then $P_1(N)$ may be 100%. Accordingly, all calls would result in an access to the communications network. If a large number of calls are granted access to the network, though, then collisions may result. Collisions prevent the network from processing the calls, and none of the calls that collide would be connected.

The network may anticipate that too many users would be granted access if N=1, and therefore the base station may transmit a value of N that is greater than 1.

For example, the base station may transmit a value of N=2. As a result, the persistence value that is calculated in program point 110 may be equal to 50%. Accordingly, during any TTI, 50% of the users would probably be granted access to the network, while 50% would be denied access and would be required to try again during another TTI. However, even when only 50% of the users are granted access to the network, the network still might conceivably be unable to handle the load. If the base station anticipates a still higher degree of collisions and network congestion, then the base station may transmit a still higher value of N. For example, the base station may transmit a value of N=3. As a result, the persistence value that is calculated in program point 110 may be equal to 25%. With N=4, statistically only 12.5% of the mobile stations will attempt to gain access to the network during any TTI, but over only a few TTIs all will attempt access. If the base station transmits a value of N=8, which is the highest value of N supported, then the persistence value would equal $1/128$, which is approximately 0.78%. In other words, for N=8, during any TTI, more than 99% of the mobile stations will wait and will not attempt to connect. Table 1 illustrates that in a "worst case scenario," the probability of achieving a connection during any TTI (i.e., the persistence value) might be extremely low, and might even be less than 1%.

TABLE 1

P (N) values.

| N | P (N) |
|---|---|
| 1 | 100.00% |
| 2 | 50.00% |
| 3 | 25.00% |
| 4 | 12.50% |
| 5 | 6.25% |
| 6 | 3.13% |
| 7 | 1.56% |
| 8 | 0.78% |

At program point 120, a random number (or pseudorandom number) R is generated. The random number or pseudorandom number R is in a range between zero and one, with equal probability of drawing any particular value within this range, and may equal zero but is strictly less than one. In other words, R may be any value anywhere between zero and one, including fractional values that are not equal to zero and that are not equal to one.

At program point 125, R is compared with P. If R is greater than or equal to P, then control proceeds to program point 130, and the attempt to access the telecommunications network during the present TTI terminates, only to be scheduled at program point 130 to be retried during an immediately subsequent TTI. During the immediately subsequent TTI, control passes to program point 120.

If the user equipment determines at program point 125 that R is less than P, then control proceeds to program point 170, and the user equipment is given access to the network, and a signal is transmitted on the RACH. At some point later in time represented by program point 180, the user equipment may receive an acknowledgement ("ACK") on the AICH, granting access to the communications network. This waiting time includes any time needed to run a backoff timer in case a NACK is received on the AICH. The acknowledgment comes, if at all, at a deterministic predetermined time relative to the access attempt. If (as determined at program point 185) the ACK does not arrive at the appropriate time, then control passes to program point 130 to wait until a TTI that immediately follows the TTI in which the ACK was expected, or in which the backoff timer expires (i.e., a next TTI), and then returns to program point 120 to try during that next TTI.

It will be apparent upon even a cursory glance at FIG. 1 that the situation in which ASC=0 is handled very differently from the situation in which ASC=1. In the situation in which ASC=0, control proceeds without uncertainty from program point 105 to program point 150, where the user equipment accesses the communications network. In the situation in which ASC=1, however, control does not proceed directly from program point 105 to program point 170, where the user equipment access the communications network. If N>1, then the probability of gaining access to the telecommunications network during any particular TTI is significantly less when ASC=1 than when ASC=0.

It should be noted that even user equipment attempting calls for which ASC=1 will eventually gain access to the communications network, and generally will not have to wait very long. Even though the probability of gaining access to the communications network may be less than 100% on any particular TTI when N>1 and ASC=1, or when ASC>1, the user equipment will probably not wait long to gain access. Even access attempts that have a small chance of success, when repeated every 10 milliseconds until successful, will generally be successful before too long.

A problem can arise, however, when many people attempt to call emergency services simultaneously or almost simultaneously within a small geographical area, a situation that can easily develop during a disaster that may occur at in a crowded urban environment or at a sporting event or other venue. If a very large number of users attempt to place a call to emergency services, each user equipment may be granted access to the network during a first TTI, clogging the telecommunications network. All such access attempts will be on the Random Access Channel (RACH). The base station will respond to overcrowding of the RACH by refusing to grant any ACKs. Accordingly, all of the user equipment that fails to receive an ACK will retry to gain access during the first TTI that follows the TTI in which the ACK was expected. All of the user equipment will again fail to gain access during that TTI (for the same reasons they failed to gain access during the previous TTI) and will again schedule a retry. No one will be able to place a call to emergency services, unless some of the users turn their cell phones off or otherwise stop trying.

Figure 2:
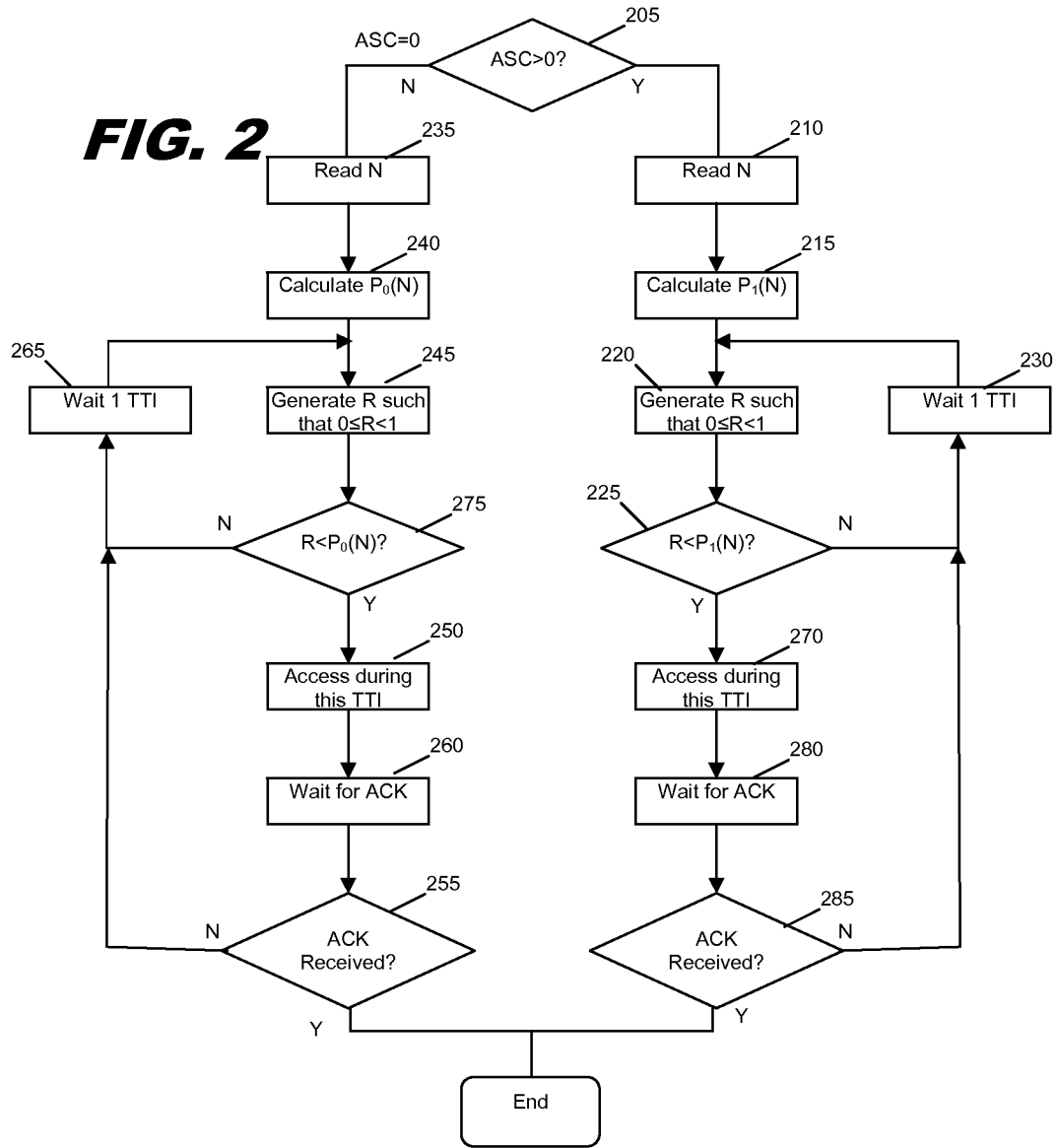
FIG. 2 is a flowchart of a method in accordance with one embodiment of the subject technology.

FIG. 2 is a flowchart of a method in accordance with one embodiment of the present subject technology. At program point 205, the user equipment determines whether the access attempt (such as an attempt to place a telephone call) should be given an ASC=0 or some other ASC, which for simplicity of presentation is represented as ASC=1. If program point 205 determines that the call is not directed to emergency services, i.e., if ASC>0, then at program point 210 the user equipment reads a value of N that has been received from a previous transmission from the base station and stored within the user equipment. At program point 215, the user equipment calculates $P_1(N)$ based on the value of N and using the formula $P_1(N)=2^{-(N-1)}$ mentioned above. If access service classes beyond ASC=0 and ASC=1 are used, scaling factors may also be used to calculate $P_{ASC}(N)$, although for present purposes such cases are treated as ASC=1.

At program point 220, a random number (or pseudorandom number) R is generated. The random number or pseudorandom number R is in a range between zero and one, with equal probability of drawing any particular value within this range, and may equal zero but is strictly less than one. R may be any value anywhere between zero and one, and need not equal exactly zero or one. At program point 225, R is compared with P. If R is greater than or equal to P, then control proceeds to program point 230, and the attempt to access the telecommunications network during the present TTI is suspended, only to be scheduled at program point 230 to be retried during an immediately subsequent TTI.

If the user equipment determines at program point 225 that R is less than P, then control proceeds to program point 270, and the user equipment is given access to the network, and a signal is transmitted on the RACH. At some point later in time represented by program point 280, the user equipment may receive an acknowledgement ("ACK") on the AICH, granting access to the communications network. This waiting time includes any time needed to run a backoff timer in case a NACK is received on the AICH.

The acknowledgment comes, if at all, at a deterministic predetermined time relative to the access attempt. If (as determined at program point 285) the ACK does not arrive at the appropriate time, then control passes to program point 230 to wait until a TTI that immediately follows the TTI in which the ACK was expected, or in which the backoff timer expires (i.e., a next TTI), and then returns to program point 220 to try during that next TTI.

The method in accordance with FIG. 1 is quite different from the method in accordance with FIG. 2, most strikingly with respect to the handling of calls to emergency services (i.e., calls for which ASC=0). If at program point 205 determines that ASC=0, the user equipment is not granted immediate access to the communications network. In the method presented in FIG. 2, if the user equipment determines that the access attempt has an ASC=0, then control proceeds to program point 235 rather than directly to program point 250. At program point 235, the user equipment reads a value of N that has been received from a previous transmission from the base station and stored within the user equipment. In an alternative embodiment, at program point 235, the user equipment reads a value of $P_1(N)$, where $P_1(N)$ has already been calculated. If at program point 240, the user equipment calculates $P_0(N)$ based on the value of N and using a modification of the formula $P_1(N)=2^{-(N-1)}$. The modification of the formula is described in greater detail below. In the alternative embodiment, $P_0(N)$ may be calculated directly from $P_1(N)$ using another modification of the formula. If access service classes beyond ASC=0 and ASC=1 are used, scaling factors may also be used to calculate $P_{ASC}(N)$, although for present purposes such cases are treated as ASC=1.

At program point 245, a random number (or pseudorandom number) R is generated. The random number or pseudorandom number R is in a range between zero and one, with equal probability of drawing any particular value within this range, and may equal zero but is strictly less than one. R may be any value anywhere between zero and one, and need not equal exactly zero or one. At program point 275, R is compared with P. If R is greater than or equal to P, then control proceeds to program point 265, and the attempt to access the telecommunications network during the present TTI is suspended, only to be scheduled at program point 265 to be retried during an immediately subsequent TTI.

If the user equipment determines at program point 275 that R is less than $P_0(N)$, then control proceeds to program point 250, and the user equipment is given access to the network, and a signal is transmitted on the RACH. At some point later in time represented by program point 260, the user equipment may receive an acknowledgement ("ACK") on the AICH, granting access to the communications network. This waiting time includes any time needed to run a backoff timer in case a NACK is received on the AICH. The acknowledgment comes, if at all, at a deterministic predetermined time relative to the access attempt. If (as determined at program point 255) the ACK does not arrive at the appropriate time, then control passes to program point 265 to wait until a TTI that immediately follows the TTI in which the ACK was expected, or in which the backoff timer expires (i.e., a next TTI), and then returns to program point 245 to try during that next TTI.

It should be noted that, in most cases, the value of $P_0(N)$ is approximately, but is not exactly, equal to 100%. In other words, $P_0(N)$ is very slightly less than 100%. The persistence value $P_0(N)$ that is used when ASC=0 is described in greater detail below, but may be calculated directly from N or indirectly from $P_1(N)$. It should also be noted that the value $P_0(N)$ that is calculated in program point 240 is greater than the value $P_1(N)$ that is calculated in program point 215, although $P_0(N)$ is not greater than 1.

Determination of $\tilde{P}_0$

The persistence value $P_0(N)$ that is used when ASC=0 is determined based on at least one of N, $P_1(N)$, and at least one of the emergency services access parameters W, A, B, and α. If desired, A may be a first emergency services access parameter, and B may be a second emergency services access parameter. If desired, A may be a first emergency services access parameter, and B may be a second emergency services access parameter, and α may be a third emergency services access parameter. If desired, W may be a first emergency services access parameter, and α may be a second emergency services access parameter. As stated above, N may be programmed in the mobile station at power-up, or may be transmitted in a system information message. $P_1(N)$ is calculated from N based upon Table 1. Emergency services access parameters W, A, B and α, and the calculation of $P_0(N)$ therefrom, are described below. Throughout this discussion, expressions such as $P_0(N)$, $P_0(N)$, $\tilde{P}_0$, and $\tilde{P}_0(N)$ are used interchangeably to represent the persistence value used when ASC=0. $P_0(N)$ and $\tilde{P}_0(N)$ are used to highlight the dependency of the persistence value on N. $\tilde{P}_0$, and $\tilde{P}_0(N)$ are used to indicate that the persistence value may be less than 100%.

The persistence value $\tilde{P}_0(N)$, used when ASC=0, may also be adjustable, or adaptive, and can be arbitrarily close to 100%. Also, $P_0(N)$ and the values form which it is calculated (i.e., at least one of N, $P_1(N)$, W, A, B, and α) may be adaptive and may adjust in response to perceived loads on the telecommunications network or on the user equipment. The value of $P_0(N)$ can be calculated from the emergency services access parameter W, which can reside within the user equipment or can be transmitted periodically from the base station, or can be calculated from other values. The emergency services access parameter W can be recalculated based on perceived network congestion, and can also be a function of N, which is transmitted from the base station, or of $P_1(N)$.

In accordance with one embodiment of the present subject technology, the persistence value may be calculated as $\tilde{P}_0(N)=1-W+(W*P_1(N))$. The emergency services access parameter W may be calculated or may be retrieved from within the user equipment, such as obtained from software, or from RAM, ROM, EEPROM, CD-ROM or other optical disk storage or digital versatile disk (DVD), etc., magnetic disk storage or other magnetic storage device. Other devices, such as a hard disk, floppy disk, magnetic strips, etc., smart cards, and flash memory devices (e.g., EPROM, card, stick, key drive, etc.), or any other medium that can be used to carry or store the emergency services access parameter W, may be used. The emergency services access parameter W may have a value that is slightly greater than zero, such as 0.1, 0.01, 0.001, or some other value.

If desired, in some embodiments the value of the emergency services access parameter W may be transmitted from a base station or from any other device in the cell. Moreover, in some embodiments, a hybrid approach may be used: a default value of the emergency services access parameter W may be stored within the user equipment, but the value of the emergency services access parameter W may be overridden should the base station transmit a new value of the emergency services access parameter W or otherwise transmit an instruction for the user equipment to replace or adjust the value of the emergency services access parameter W.

Other functions of the emergency services access parameter W may be used to determine $\tilde{P}_0(N)$. For example, $\tilde{P}_0(N)$ may be represented as a nonlinear function of the emergency services access parameter W, or of $P_1(N)$, or as any monotonically decreasing function of the emergency services access parameter W or of $P_1(N)$. $\tilde{P}_0(N)$ may be a parabolic, polygonal, or any other function of the emergency services access parameter W or of $P_1(N)$ such that $\tilde{P}_0(N)$ may be expressed as a probability.

In one embodiment, the persistence value $\tilde{P}_0(N)$ may be calculated in accordance with $$\tilde{P}_0(N) = A + B \frac{1}{2^{(N-1)}}.$$

It should be recalled that although $\tilde{P}_0(N)$ may be slightly less than 100%, $\tilde{P}_0(N)$ should remain greater than $P_1(N)$ (in this embodiment), to preserve priority for calls to emergency services. Accordingly, the value of the emergency services access parameter A may be slightly less than 100%, and the value of the emergency services access parameter B may be slightly greater than zero. For example, the value of the emergency services access parameter A may be 99% of $P_1(N)$, and the value of the emergency services access parameter B may be 1% of $P_1(N)$. If desired, the value of the emergency services access parameter A may be 99.9% of $P_1(N)$, and the value of the emergency services access parameter B may be 0.1% of $P_1(N)$, or the value of the emergency services access parameter A may be 99.99% of $P_1(N)$, and the value of the emergency services access parameter B may be 0.01% of $P_1(N)$. The value of the emergency services access parameter A and the value of the emergency services access parameter B may be stored within the user equipment or may be transmitted by the base station or other device, or may be recalculated by the user equipment based on other factors or parameters or from measured values.

In yet another embodiment, the persistence value $\tilde{P}_0(N)$ may be calculated in accordance with $$\tilde{P}_0(N) = A + B \left(\frac{1}{2^{(N-1)}}\right)^\alpha.$$

The value of the emergency services access parameter α (i.e., an exponent) may be 0.01 or other positive number that is only slightly greater than zero. The value of the emergency services access parameter A may be slightly less than 100% of $P_1(N)$, and the value of the emergency services access parameter B may be slightly greater than zero. For example, the value of the emergency services access parameter A may be 99% of $P_1(N)$, and the value of the emergency services access parameter B may be 1% of $P_1(N)$, and the value of the emergency services access parameter α may be 0.01. If desired, the value of the emergency services access parameter A may be 99.9% of $P_1(N)$, and the value of the emergency services access parameter B may be 0.1% of $P_1(N)$, or the value of the emergency services access parameter A may be 99.99% of $P_1(N)$, and the value of the emergency services access parameter B may be 0.01% of $P_1(N)$, and the value of the emergency services access parameter α may be 0.1. Based on the formulas above, the persistence level can be arbitrarily close to 100%, without being exactly 100%.

w

Determination of the Emergency Services Access Parameter W

As stated above, the value of the emergency services access parameter W may be transmitted from the base station. According to the 3GPP specification TS 25.331 standards, the value of N, and possibly several scaling factors, may be broadcast from a base station within System Information Blocks (SIBs). The base station may transmit a scaling factor for each access service class (ASC) beyond ASC=1, such that a persistence value may be calculated for ASC=2, ASC=3, etc. to ASC=7. Accordingly, the base station may control the persistence level that the mobile station uses for each type of call. If no scaling factors are transmitted, then all calls other than to emergency services have an identical persistence value P, as defined in section 8.5.12 of 3GPP specification TS 25.331. Each ASC is assigned a MAC Logical channel Priority (MLP) in a range of 1 to 8. The value N that may be transmitted from a base station, e.g. within System Information Block (SIB) 7.

The following table from 3GPP specification TS 25.331 indicates that scaling factors are not used for calls having an ASC=0 or ASC=1, but are used only for calls of other access service classes.

| | ASC # i | | | | | | | |
|---|---|---|---|---|---|---|---|---|
| | 0 | 1 | 2 | 3 | 4 | 5 | 6 | 7 |
| $P_i$ | 1 | P(N) | $s_2$ P(N) | $s_3$ P(N) | $s_4$ P(N) | $s_5$ P(N) | $s_6$P(N) | $s_7$ P(N) | where $P(N) = 2^{-(N-1)}$ where N is the dynamic persistence level, which can assume values from 1 through 8 and is broadcast in System Information Block 7. See 3GPP TS 25.331, section 8.5.12 where $P_1$ is the "persistence value", associated with ASC # i where the persistence value could be considered as equivalent to an access threshold value, and where $s_2, s_3, \ldots, s_7$ are called scaling factors and are real numbers in the range [0.2, 0.9], in increments of 0.1, see 3GPP TS 25.331, section 10.3.6.48.

Since the scaling factors (and other values) within the System Information Blocks transmitted by the base station are optional, the System Information Blocks described in 3GPP specification TS 25.331 may be modified to include a value of the emergency services access parameter W. Accordingly, the emergency services access parameter W may be transmitted from the base station along with other values.

Very Few Retries Needed, Even where $P_0(N)<100\%$

Using a persistence value $P_0(N)$ that is slightly less than 100% for calls to emergency services provides significant advantages. When many people attempt to call emergency services simultaneously or almost simultaneously from within a small geographical area, a few (i.e., a very small percentage) are delayed one TTI. Such a delay is not noticeable, since the TTI is only 10 milliseconds. However, such a delay can vastly improve the performance of the communications network by relieving congestion. Since slightly fewer calls are attempted during the first TTI, there is a greater likelihood of some calls gaining access. During a second TTI, the calls for which no access was attempted during the first TTI will certainly gain access, since there are so few of them. The calls that attempted and failed to gain access during the first TTI can retry almost immediately, and will almost certainly succeed, since $P_0(N)$ is so close to 100%.

It may be noted that there is an extremely small probability of a call to emergency services not being connected during a first or second TTI, or even during a subsequent TTI, but even these calls will be connected within only a few TTIs. Since each TTI has a duration of only 10 milliseconds, even calls that require two or three TTIs to connect will be connected without any noticeable delay.

The extremely small probability and the small number of retries can be understood by recognizing that even where an access attempt is unsuccessful, a retry with an extremely high probability of success immediately follows. The retry has the same extremely high $P_0(N)$ and a different RA loop including program point 275 and program point 245 iterates until a random number R is drawn that is not greater than P. Since P is very close to 100%, and since each attempt at program point 250 only fails when many other users are also vying for the RACH and have not yet connected, any delays in providing connection will not be noticeable. While in theory this loop may iterate several times, in fact it is extremely unlikely to iterate more than one or two times. The reason for the loop to terminate early is that the persistence value is very close to 100%. Accordingly, each random number R that is between zero and one is likely to be less than persistence value. When the random number R is less than (or equal to) the persistence value, the loop terminates and control passes program point 250; the attempted access is successful.

Each TTI, the user equipment draws a new random number and compares the random number to the persistence value. There is no maximum number of attempts; attempts are made, and made again, until a connection is established.

An example may illustrate this point. If P=99.99%, then the user equipment has only a 0.01% probability of requiring a second iteration through the loop. There is only a 0.000001% probability that a third iteration through loop would be required. Each iteration through the loop requires, approximately, 10 ms to complete. The probability of needing more than two or three iterations through the loop is extremely remote.

In a major crisis in which very large numbers of users attempt to call 911 almost simultaneously, FIG. 2 provides an effective technique for allowing shared use of the cellular network. During a first TTI, which might last approximately 10 milliseconds, most of the mobile stations (statistically, approximately $\tilde{P}_0(N)$ as a percentage of the users attempting access) would initiate an access attempt on a Random Access Channel (RACH), also known as a Physical Random Access Channel (PRACH). A few of these might not receive an acknowledgement for one or two TTIs. During a second TTI, most of the mobile stations that did not attempt access during the first TTI would attempt access on the Random Access Channel during the second TTI. During a later TTI, some of the mobile stations that were denied service during the first TTI would recognize a lack of acknowledgement, and would again attempt access on the Random Access Channel; such subsequent attempts would be more likely to succeed, since the mobile stations that did gain access during the first TTI would no longer be using the Random Access Channel and consequently there would be less congestion.

Each TTI, some mobile stations would gain access and would therefore switch from the Random Access Channel, and the remainder of the mobile stations would consequently be more likely to gain access on a subsequent attempt. Over a few TTIs, many of the mobile stations would gain access. The mobile stations that do not gain access during the first TTI would be extremely likely to gain access during the second TTI, and those that did not gain access then would be extremely likely to gain access during a third TTI. If a mobile station has a 99.9% probability of gaining access during any TTI, then the mobile station would have an extremely high probability of gaining access within a few TTIs.

Even in a "worst case scenario" in which N=8 and therefore $P_1(N)$ is a mere 0.78%, indicating that during each TTI the probability of a non-emergency call being connected is less than 1%, the probability of connecting an emergency call remains extremely high, and connection is almost a certainty within only a few attempts.

TABLE 2

Access failure probability for N = 8
Access failure probability after k attempts

| | W | P0 | k | | | | | |
|---|---|---|---|---|---|---|---|---|
| | | | 1 | 2 | 3 | 4 | 5 | 6 |
| N = 8 | 0.01 | 0.99 | 9.92E−03 | 9.84E−05 | 9.77E−07 | 9.69E−09 | 9.62E−11 | 9.54E−13 |
| P(N) | 0.02 | 0.98 | 1.98E−02 | 3.94E−04 | 7.81E−06 | 1.55E−07 | 3.08E−09 | 6.11E−11 |
| 0.78% | 0.03 | 0.97 | 2.98E−02 | 8.86E−04 | 2.64E−05 | 7.85E−07 | 2.34E−08 | 6.95E−10 |
| | 0.04 | 0.96 | 3.97E−02 | 1.58E−03 | 6.25E−05 | 2.48E−06 | 9.85E−08 | 3.91E−09 |
| | 0.05 | 0.95 | 4.96E−02 | 2.46E−03 | 1.22E−04 | 6.06E−06 | 3.00E−07 | 1.49E−08 |
| | 0.06 | 0.94 | 5.95E−02 | 3.54E−03 | 2.11E−04 | 1.26E−05 | 7.48E−07 | 4.45E−08 |
| | 0.07 | 0.93 | 6.95E−02 | 4.82E−03 | 3.35E−04 | 2.33E−05 | 1.62E−06 | 1.12E−07 |
| | 0.08 | 0.92 | 7.94E−02 | 6.30E−03 | 5.00E−04 | 3.97E−05 | 3.15E−06 | 2.50E−07 |
| | 0.09 | 0.91 | 8.93E−02 | 7.97E−03 | 7.12E−04 | 6.36E−05 | 5.68E−06 | 5.07E−07 |
| | 0.10 | 0.90 | 9.92E−02 | 9.84E−03 | 9.77E−04 | 9.69E−05 | 9.62E−06 | 9.54E−07 |
| | 0.11 | 0.89 | 1.09E−01 | 1.19E−02 | 1.30E−03 | 1.42E−04 | 1.55E−05 | 1.69E−06 |
| | 0.12 | 0.88 | 1.19E−01 | 1.42E−02 | 1.69E−03 | 2.01E−04 | 2.39E−05 | 2.85E−06 |
| | 0.13 | 0.87 | 1.29E−01 | 1.66E−02 | 2.15E−03 | 2.77E−04 | 3.57E−05 | 4.60E−06 |
| | 0.14 | 0.86 | 1.39E−01 | 1.93E−02 | 2.68E−03 | 3.72E−04 | 5.17E−05 | 7.18E−06 |
| | 0.15 | 0.85 | 1.49E−01 | 2.21E−02 | 3.30E−03 | 4.91E−04 | 7.30E−05 | 1.09E−05 |
| | 0.16 | 0.84 | 1.59E−01 | 2.52E−02 | 4.00E−03 | 6.35E−04 | 1.01E−04 | 1.60E−05 |
| | 0.17 | 0.83 | 1.69E−01 | 2.85E−02 | 4.80E−03 | 8.09E−04 | 1.37E−04 | 2.30E−05 |
| | 0.18 | 0.82 | 1.79E−01 | 3.19E−02 | 5.70E−03 | 1.02E−03 | 1.82E−04 | 3.24E−05 |

TABLE 2-continued

Access failure probability for N = 8
Access failure probability after k attempts

| W | P0 | 1 | 2 | 3 | 4 | 5 | 6 |
|---|---|---|---|---|---|---|---|
| | | | | k | | | |
| 0.19 | 0.81 | 1.89E−01 | 3.55E−02 | 6.70E−03 | 1.26E−03 | 2.38E−04 | 4.49E−05 |
| 0.20 | 0.80 | 1.98E−01 | 3.94E−02 | 7.81E−03 | 1.55E−03 | 3.08E−04 | 6.11E−05 |

Table 2 includes the access failure probability for N=8 as a function of the chosen value of the emergency services access parameter W and as a function of the number of access attempts. It should be pointed out that the UE will execute a new access attempt at the next available TTI (Transmission Time Interval) and will keep trying until access is successful, or until the UE goes out of coverage. The TTI can be 10 ms or 20 ms, but in most cases the network configures only the 10 ms TTI length for the random access channel (RACH). The table can be read in terms of delays as well.

For example, for a 10 ms TTI the Table 2 above indicates that with an exemplary value of the emergency services access parameter W=0.10, and with a value of P(N)=0.78% the probability that an emergency call will be delayed by more than 60 ms due to the proposed changes to the access procedure for ASC=0 is less than 1 in a million (9.54×10-7).

It is important to note that an additional delay in the access procedure may result in an increase of the probability of a failed emergency call, since the radio conditions keep changing during the access procedure. It is difficult to quantify this increase in the probability of a failed emergency call, but it is likely that for very small delays, e.g. few tens of milliseconds, the increase should be quite small.

Table 3 includes the access failure probability for N=4 as a function of the chosen value of the emergency services access parameter W and as a function of the number of access attempts.

TABLE 3

Access failure probability for N = 4
Access failure probability after k attempts

| | W | P0 | 1 | 2 | 3 | 4 | 5 | 6 |
|---|---|---|---|---|---|---|---|---|
| | | | | | k | | | |
| N = 4 | 0.01 | 0.99 | 8.75E−03 | 7.66E−05 | 6.70E−07 | 5.86E−09 | 5.13E−11 | 4.49E−13 |
| P(N) | 0.02 | 0.98 | 1.75E−02 | 3.06E−04 | 5.36E−06 | 9.38E−08 | 1.64E−09 | 2.87E−11 |
| 12.50% | 0.03 | 0.97 | 2.63E−02 | 6.89E−04 | 1.81E−05 | 4.75E−07 | 1.25E−08 | 3.27E−10 |
| | 0.04 | 0.97 | 3.50E−02 | 1.23E−03 | 4.29E−05 | 1.50E−06 | 5.25E−08 | 1.84E−09 |
| | 0.05 | 0.96 | 4.38E−02 | 1.91E−03 | 8.37E−05 | 3.66E−06 | 1.60E−07 | 7.01E−09 |
| | 0.06 | 0.95 | 5.25E−02 | 2.76E−03 | 1.45E−04 | 7.60E−06 | 3.99E−07 | 2.09E−08 |
| | 0.07 | 0.94 | 6.13E−02 | 3.75E−03 | 2.30E−04 | 1.41E−05 | 8.62E−07 | 5.28E−08 |
| | 0.08 | 0.93 | 7.00E−02 | 4.90E−03 | 3.43E−04 | 2.40E−05 | 1.68E−06 | 1.18E−07 |
| | 0.09 | 0.92 | 7.88E−02 | 6.20E−03 | 4.88E−04 | 3.85E−05 | 3.03E−06 | 2.39E−07 |
| | 0.10 | 0.91 | 8.75E−02 | 7.66E−03 | 6.70E−04 | 5.86E−05 | 5.13E−06 | 4.49E−07 |
| | 0.11 | 0.90 | 9.62E−02 | 9.26E−03 | 8.92E−04 | 8.58E−05 | 8.26E−06 | 7.95E−07 |
| | 0.12 | 0.90 | 1.05E−01 | 1.10E−02 | 1.16E−03 | 1.22E−04 | 1.28E−05 | 1.34E−06 |
| | 0.13 | 0.89 | 1.14E−01 | 1.29E−02 | 1.47E−03 | 1.67E−04 | 1.90E−05 | 2.17E−06 |
| | 0.14 | 0.88 | 1.23E−01 | 1.50E−02 | 1.84E−03 | 2.25E−04 | 2.76E−05 | 3.38E−06 |
| | 0.15 | 0.87 | 1.31E−01 | 1.72E−02 | 2.26E−03 | 2.97E−04 | 3.89E−05 | 5.11E−06 |
| | 0.16 | 0.86 | 1.40E−01 | 1.96E−02 | 2.74E−03 | 3.84E−04 | 5.38E−05 | 7.53E−06 |
| | 0.17 | 0.85 | 1.49E−01 | 2.21E−02 | 3.29E−03 | 4.90E−04 | 7.28E−05 | 1.08E−05 |
| | 0.18 | 0.84 | 1.58E−01 | 2.48E−02 | 3.91E−03 | 6.15E−04 | 9.69E−05 | 1.53E−05 |
| | 0.19 | 0.83 | 1.66E−01 | 2.76E−02 | 4.59E−03 | 7.64E−04 | 1.27E−04 | 2.11E−05 |
| | 0.20 | 0.83 | 1.75E−01 | 3.06E−02 | 5.36E−03 | 9.38E−04 | 1.64E−04 | 2.87E−05 |

Table 4 includes the access failure probability for N=2 as a function of the chosen value of the emergency services access parameter W and as a function of the number of access attempts.

TABLE 4

Access failure probability for N = 2
Access failure probability after k attempts

| | W | P0 | 1 | 2 | 3 | 4 | 5 | 6 |
|---|---|---|---|---|---|---|---|---|
| | | | | | k | | | |
| N = 2 | 0.01 | 1.00 | 5.00E−03 | 2.50E−05 | 1.25E−07 | 6.25E−10 | 3.13E−12 | 1.56E−14 |
| P(N) | 0.02 | 0.99 | 1.00E−02 | 1.00E−04 | 1.00E−06 | 1.00E−08 | 1.00E−10 | 1.00E−12 |
| 50.00% | 0.03 | 0.99 | 1.50E−02 | 2.25E−04 | 3.38E−06 | 5.06E−08 | 7.59E−10 | 1.14E−11 |

TABLE 4-continued

Access failure probability for N = 2
Access failure probability after k attempts

| W | P0 | k=1 | k=2 | k=3 | k=4 | k=5 | k=6 |
|---|---|---|---|---|---|---|---|
| 0.04 | 0.98 | 2.00E−02 | 4.00E−04 | 8.00E−06 | 1.60E−07 | 3.20E−09 | 6.40E−11 |
| 0.05 | 0.98 | 2.50E−02 | 6.25E−04 | 1.56E−05 | 3.91E−07 | 9.77E−09 | 2.44E−10 |
| 0.06 | 0.97 | 3.00E−02 | 9.00E−04 | 2.70E−05 | 8.10E−07 | 2.43E−08 | 7.29E−10 |
| 0.07 | 0.97 | 3.50E−02 | 1.23E−03 | 4.29E−05 | 1.50E−06 | 5.25E−08 | 1.84E−09 |
| 0.08 | 0.96 | 4.00E−02 | 1.60E−03 | 6.40E−05 | 2.56E−06 | 1.02E−07 | 4.10E−09 |
| 0.09 | 0.96 | 4.50E−02 | 2.02E−03 | 9.11E−05 | 4.10E−06 | 1.85E−07 | 8.30E−09 |
| 0.10 | 0.95 | 5.00E−02 | 2.50E−03 | 1.25E−04 | 6.25E−06 | 3.12E−07 | 1.56E−08 |
| 0.11 | 0.95 | 5.50E−02 | 3.02E−03 | 1.66E−04 | 9.15E−06 | 5.03E−07 | 2.77E−08 |
| 0.12 | 0.94 | 6.00E−02 | 3.60E−03 | 2.16E−04 | 1.30E−05 | 7.78E−07 | 4.67E−08 |
| 0.13 | 0.94 | 6.50E−02 | 4.22E−03 | 2.75E−04 | 1.79E−05 | 1.16E−06 | 7.54E−08 |
| 0.14 | 0.93 | 7.00E−02 | 4.90E−03 | 3.43E−04 | 2.40E−05 | 1.68E−06 | 1.18E−07 |
| 0.15 | 0.93 | 7.50E−02 | 5.63E−03 | 4.22E−04 | 3.16E−05 | 2.37E−06 | 1.78E−07 |
| 0.16 | 0.92 | 8.00E−02 | 6.40E−03 | 5.12E−04 | 4.10E−05 | 3.28E−06 | 2.62E−07 |
| 0.17 | 0.92 | 8.50E−02 | 7.23E−03 | 6.14E−04 | 5.22E−05 | 4.44E−06 | 3.77E−07 |
| 0.18 | 0.91 | 9.00E−02 | 8.10E−03 | 7.29E−04 | 6.56E−05 | 5.90E−06 | 5.31E−07 |
| 0.19 | 0.91 | 9.50E−02 | 9.02E−03 | 8.57E−04 | 8.15E−05 | 7.74E−06 | 7.35E−07 |
| 0.20 | 0.90 | 1.00E−01 | 1.00E−02 | 1.00E−03 | 1.00E−04 | 1.00E−05 | 1.00E−06 |

Table 5 includes the access failure probability for N=1 as a function of the chosen value of the emergency services access parameter W and as a function of the number of access attempts.

TABLE 5

Access failure probability for N = 1
Access failure probability after k attempts

| | W | P0 | k=1 | k=2 | k=3 | k=4 | k=5 | k=6 |
|---|---|---|---|---|---|---|---|---|
| N = 1 | 0.01 | 1.00 | 0 | 0 | 0 | 0 | 0 | 0 |
| P(N) | 0.02 | 1.00 | 0 | 0 | 0 | 0 | 0 | 0 |
| 100.00% | 0.03 | 1.00 | 0 | 0 | 0 | 0 | 0 | 0 |
| | 0.04 | 1.00 | 0 | 0 | 0 | 0 | 0 | 0 |
| | 0.05 | 1.00 | 0 | 0 | 0 | 0 | 0 | 0 |
| | 0.06 | 1.00 | 0 | 0 | 0 | 0 | 0 | 0 |
| | 0.07 | 1.00 | 0 | 0 | 0 | 0 | 0 | 0 |
| | 0.08 | 1.00 | 0 | 0 | 0 | 0 | 0 | 0 |
| | 0.09 | 1.00 | 0 | 0 | 0 | 0 | 0 | 0 |
| | 0.10 | 1.00 | 0 | 0 | 0 | 0 | 0 | 0 |
| | 0.11 | 1.00 | 0 | 0 | 0 | 0 | 0 | 0 |
| | 0.12 | 1.00 | 0 | 0 | 0 | 0 | 0 | 0 |
| | 0.13 | 1.00 | 0 | 0 | 0 | 0 | 0 | 0 |
| | 0.14 | 1.00 | 0 | 0 | 0 | 0 | 0 | 0 |
| | 0.15 | 1.00 | 0 | 0 | 0 | 0 | 0 | 0 |
| | 0.16 | 1.00 | 0 | 0 | 0 | 0 | 0 | 0 |
| | 0.17 | 1.00 | 0 | 0 | 0 | 0 | 0 | 0 |
| | 0.18 | 1.00 | 0 | 0 | 0 | 0 | 0 | 0 |
| | 0.19 | 1.00 | 0 | 0 | 0 | 0 | 0 | 0 |
| | 0.20 | 1.00 | 0 | 0 | 0 | 0 | 0 | 0 |

Figure 3:
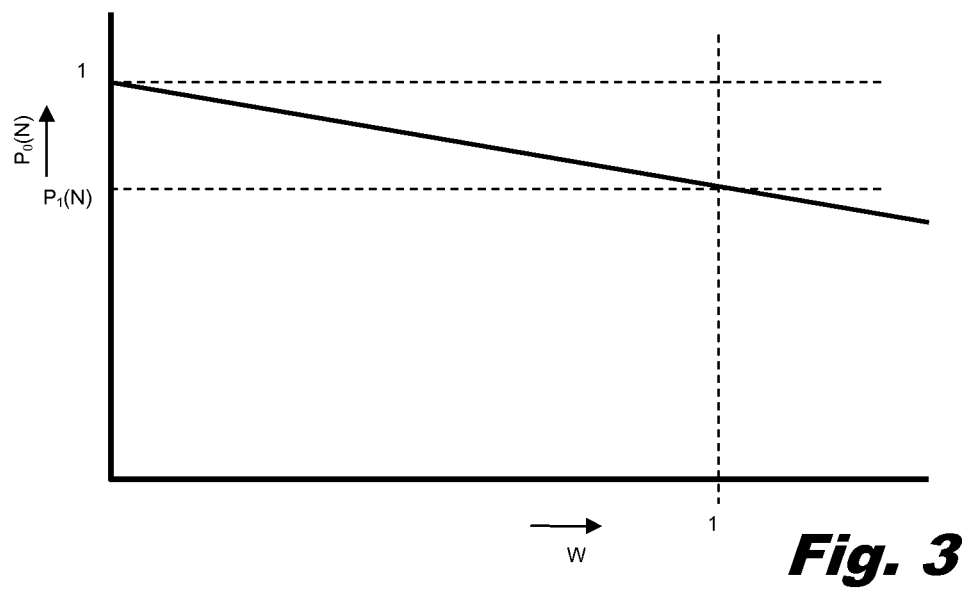
FIG. 3 is a graph of P as a function of the emergency services access parameter W, in accordance with one embodiment of the present subject technology.

FIG. 3 is a graph of P as a function of the emergency services access parameter W. As can be seen from FIG. 3 and also from the equation $\tilde{P}_0(N)=1-W+(W*P(N))$, the graph of P as a function of the emergency services access parameter W is linear, with a slope of 1−P(N) and a vertical-axis intercept of P=1. As can be seen from the figure, by setting the emergency services access parameter W arbitrarily close to zero (though slightly positive), the probability of any access attempt resulting in a successful connection to emergency services can be set arbitrarily close to 100%. It should be recalled that even those mobile stations that do not connect during any particular TTI will almost certainly achieve a connection during the next TTI, resulting in a delay of only 10 milliseconds, which would not be noticeable.

N may increase and may change the P(N), but the graph presented in FIG. 3 will not be altered thereby, since the graph is a function of the emergency services access parameter W. It should be recalled that the emergency services access parameter W is independent of N, but that $\tilde{P}_0(N)$ depends on both the emergency services access parameter W and N.

It can be seen that when the emergency services access parameter W=1, the persistence value for emergency calls (i.e., calls with an ASC=0) is identical to the persistence value of calls having an ASC=1. When the emergency services access parameter W<1, calls to emergency services are more likely than other calls to be connected during any TTI, and therefore are less likely to have to wait for service. If the emergency services access parameter W is greater than 1, then calls to emergency services would be less likely than other calls to receive service. For this reason, in many embodiments, the emergency services access parameter W should be kept between zero and one. The value of the emergency services access parameter W may be seen as reflecting a balance between the need to connect emergency services and a need to relieve congestion on cellular networks.

The relationship between the persistence value P and the emergency services access parameter W need not be linear, and the emergency services access parameter W may have its own relationship to N. Nonlinear functions of the emergency services access parameter W may be advantageous, and a desired value of $\tilde{P}_0(N)$ for various values of the emergency services access parameter W might be obtained empirically. For example, it may be desirable for $\tilde{P}_0(N)$ to remain approximately 1 ($\tilde{P}_0(N)$ is not greater than one) so that calls to emergency services have a high likelihood of being connected, and for $\tilde{P}_0(N)$ to remain greater than $P_1(N)$ for any given N so that calls to emergency services are more likely than other calls to be connected. However, it may be advantageous to reduce $\tilde{P}_0(N)$ slightly in the presence of intense congestion. Since N is increased when the base station anticipates congestion, it may be desirable for $\tilde{P}_0(N)$ to reduce slightly as congestion becomes more problematic. As stated above, in a major crisis in which very large numbers of users attempt to call 911 almost simultaneously, and most of the mobile stations (statistically, approximately $\tilde{P}_0(N)$ as a percentage of the users attempting access) would initiate an access attempt on a Random Access Channel (RACH).

In one embodiment or possible implementation, the user equipment has stored therein an emergency services access parameter W. The emergency services access parameter W may be used to determine a probability when ASC=0, in accordance with a probability function that is used only when ASC=0. For example, in some embodiments, $\tilde{P}_0(N)=1-W+(W*P_1(N))$, where $P_1(N)$ depends on a value of N that is transmitted from the base station and "*" indicates multiplication. In other words, $$\tilde{P}_0(N) = 1 - W + \frac{W}{2^{(N-1)}}.$$

In one such embodiment, the emergency services access parameter W is "hard-wired" into the user equipment, either in hardware or software, or resides in non-volatile memory. In another such embodiment, the emergency services access parameter W is transmitted from the base station, and may be adjusted by a base station controller depending on various factors.

The aforementioned equation is linear with respect to the emergency services access parameter W, but may be replaced with any function of the emergency services access parameter W such that when the emergency services access parameter W=0, $\tilde{P}_0=1$, and for all values of the emergency services access parameter W, $0 \leq \tilde{P}_0 \leq 1$. For example, $\tilde{P}_0$ may be a monotonically decreasing function of the emergency services access parameter W. $\tilde{P}_0$ as a function of the emergency services access parameter W mat be parabolic, polygonal, or any other function that can produce a value for $\tilde{P}_0$ that can be expressed as a probability.

Other Embodiments for Establishing a Persistence Value <100% for ASC=0

In some embodiments, $$\tilde{P}_0(N) = A + B \frac{1}{2^{(N-1)}}.$$

In some embodiments, $$\frac{1}{2^{(N-1)}}$$

is taken to an exponent α, such that $$\tilde{P}_0(N) = A + B \left( \frac{1}{2^{(N-1)}} \right)^\alpha,$$

where α>0. The value α may be a real number greater than zero. If desired, α may be restricted to values no greater than one. Alternatively, the function connecting 1 and P(N) could be any other function, e.g. a quadratic function, a cubic function, or, more in general, any function that monotonically decreases from the value 1 to the value P(N) as the emergency services access parameter W is increased from 0 to 1, for an assumed value of N.

As the following table shows, when values of ASC that are greater than 1 are allowed, scaling factors are used, and the scaling factors (which are all less than one) ensure that the persistence value $P_0(N)$ that is used when ASC=0 is greater than the persistence values that are used for all other ASCs.

| | ASC # i | | | | | | |
|---|---|---|---|---|---|---|---|
| 0 | 1 | 2 | 3 | 4 | 5 | 6 | 7 |
| $P_i$ $1-W+W*P(N)$ | P(N) | $s_2$ P(N) | $s_3$ P(N) | $s_4$ P(N) | $s_5$ P(N) | $s_6$ P(N) | $s_7$ P(N) | where $P(N) = 2^{-(N-1)}$ where N is the dynamic persistence level sent in System Information Block 7 where the emergency services access parameter W is an emergency services access parameter (such as a constant value and a real number) that could have values comprised in the range [0, 1].

In other words, if ASC=0 then $Pi=P_0(N)=1-W+W*P(N)$

If the emergency services access parameter W=0, then $P_0(N)=1$

If the emergency services access parameter W=1, then $P_0(N)=P_1(N)$

If the emergency services access parameter W is between 0 and 1, then $P_0(N)$ is a value between $P_1(N)$ and 1.

Figure 4:
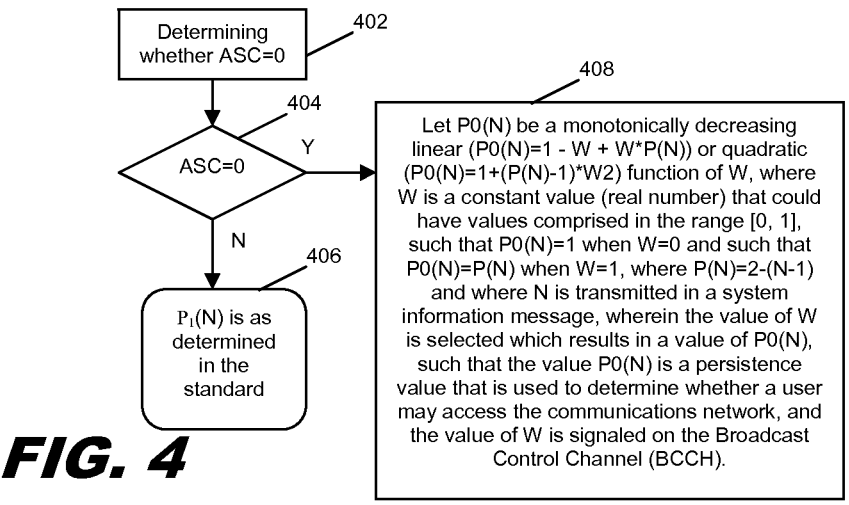
FIG. 4 is a flowchart of a method in accordance with another embodiment.

FIG. 4 is a flowchart of a method in accordance with another embodiment. At program point 402, a determination is made whether ASC=0; in other words, whether the mobile station is attempting access to emergency services. If at program point 404 the determination indicates that ASC=0, then $P_0(N)$ is calculated as a function of the emergency services access parameter W, and also a function of at least one of N and $P_1(N)$. For example, $P_0(N)$ may be a monotonically decreasing linear function of the emergency services access parameter W and a function $P_1(N)$, such as $P_0(N)=1-W+W*P_1(N)$. If desired, $P_0(N)$ may be a quadratic function of the emergency services access parameter W and a function of $P_1(N)$, such as $P_0(N)=1+(P_1(N)-1*W^2$. The emergency services access parameter W may be a constant value (real number). For example, the emergency services access parameter W may have values comprised in the range [0, 1], or some other range from a first value to a second value. The emergency services access parameter W may be any value anywhere between zero and one, and need not equal exactly zero or one. When the emergency services access parameter W has the first value, e.g. 0, $P_0(N)$ may equal 1 (according to the function) and when the emergency services access parameter W has the second value, e.g. 1, $P_0(N)$ may equal $P_1(N)$. As described above, generally, $P_1(N)=2^{-(N-1)}$. N may be programmed in the mobile station at power-up, or may be transmitted in a system information message. The value $P_0(N)$ may be a persistence value that is used to determine whether a user may access the communications network, and the value of the emergency services access parameter W may be signaled on the Broadcast Control Channel (BCCH). If ASC is not 0, i.e. if the access attempt is not to emergency services, then the persistence value $P_1(N)$ is as determined in the standard.

Figure 5:
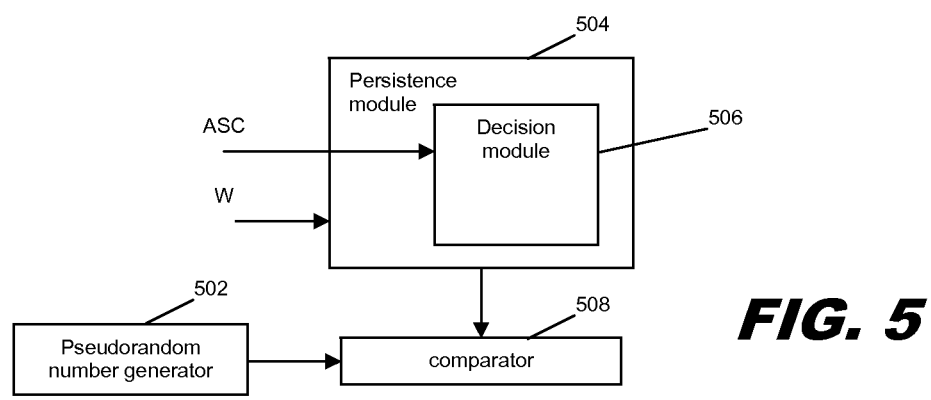
FIG. 5 is a block diagram in accordance with an embodiment.

FIG. 5 is a block diagram of an embodiment. A pseudorandom number generator 502 generates a pseudorandom number. A persistence module 504 includes a decision module 506 that receives a value of ASC and determines whether ASC=0. If ASC does not equal 0, then the persistence module 404 determines a persistence value $P_1(N)$ based N. If ASC=0, then the persistence module 404 determines a persistence value $P_0(N)$ based on the emergency services access parameter W, and also based on at least one of N and $P_1(N)$. A comparator 506 allow a user to access the communications network only if the pseudorandom number is less than the persistence value, i.e. $P_0(N)$ when ASC=0 and $P_1(N)$ otherwise. In general, $P_0(N)$ can assume any values smaller than 1 and larger than P(N), and generally $P(N)=2^{-(N-1)}$, although other values may be possible. N may be re-programmed or may be transmitted in a system information message.

Figure 6:
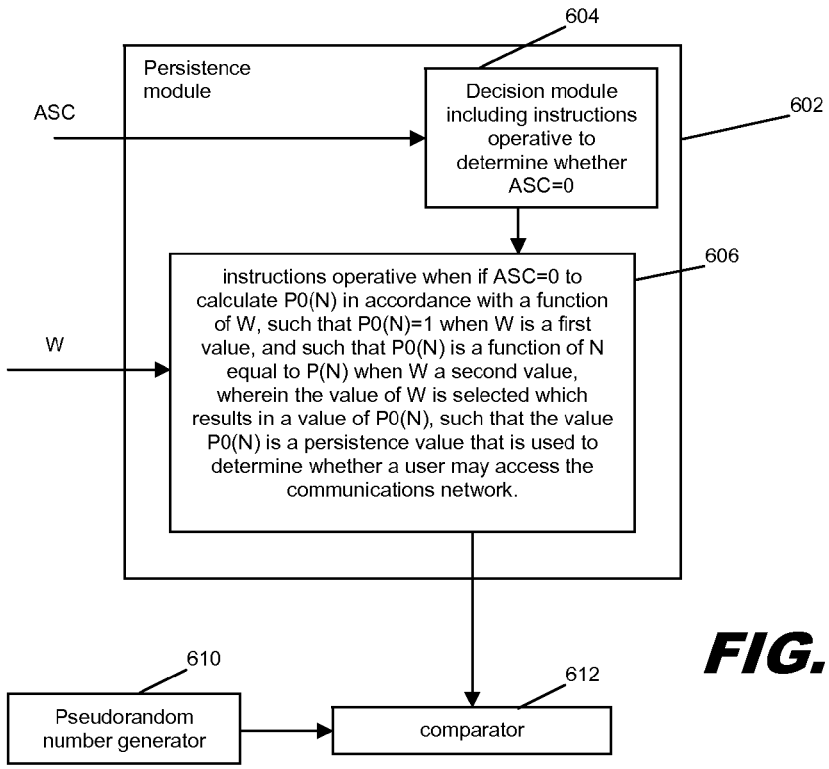
FIG. 6 is a block diagram in accordance with an embodiment.

FIG. 6 is a block diagram in accordance with an embodiment. A persistence module 602 includes instructions operative to determine whether ASC=0. The persistence module 602 also includes, in a calculation module 606, instructions operative when if ASC=0 to calculate a persistence value $P_0(N)$ in accordance with a function of the emergency services access parameter W. The function may be such that $P_0(N)=1$ when the emergency services access parameter W is a first value (e.g. 0), and such that $P_0(N)=P(N)$ when the emergency services access parameter W a second value (e.g. 1). In other words, $P_0(N)$ may be a function of at least one of N and $P_1(N)$ when the emergency services access parameter W is the second value. The value $P_0(N)$ is a persistence value that is used to determine whether a user may access the communications network. The persistence module 602 is operative to calculate the first persistence $P_0(N)$ value if ASC=0, and a second persistence value $P_1(N)$ less than the first persistence value otherwise. In accordance with a standard, $P_1(N)=2^{-(N-1)}$, although theoretically $P_1(N)$ can be any function of N. If desired, N may be programmed into the mobile station at manufacture or at power-up, or may be transmitted in a system information message.

In other words, the decision module 604 can determine whether ASC=0. The persistence module 602 calculates a first persistence $P_0(N)$ value if ASC=0, and a second persistence value $P_1(N)$ less than the first persistence value otherwise. The first persistence value is a function of the emergency services access parameter W, such as a monotonically decreasing function of the emergency services access parameter W, where the emergency services access parameter W may be a constant value (real number). If desired, the emergency services access parameter W may be restricted to the range [0, 1], such that $P_0(N)=1$ when the emergency services access parameter W=0 (or some other first value) and such that $P_0(N)=P_1(N)$ when the emergency services access parameter W=1 (or some other second value). The emergency services access parameter W may be any value anywhere between zero and one, and need not equal exactly zero or one. According to a standard, $P_1(N)=2^{-(N-1)}$, although some other function of N may be used. N may be stored in the mobile station at power-up or at manufacture, or may be transmitted in a system information message. $P_0(N)$ is a persistence value that is used to determine whether a user may access the communications network when ASC=0.

The function of the emergency services access parameter W may be a monotonically decreasing function of the emergency services access parameter W, such as a linear or quadratic function. The function of W may be a linear unction such as $P_0(N)=1-W+W*P(N)$, or a quadratic function such as the quadratic function of the emergency services access parameter W is $P_0(N)=1+(P(N)-1)*W^2$, or some other function of the emergency services access parameter W. The value of the emergency services access parameter W may be signaled on the Broadcast Control Channel (BCCH).

Figure 7:
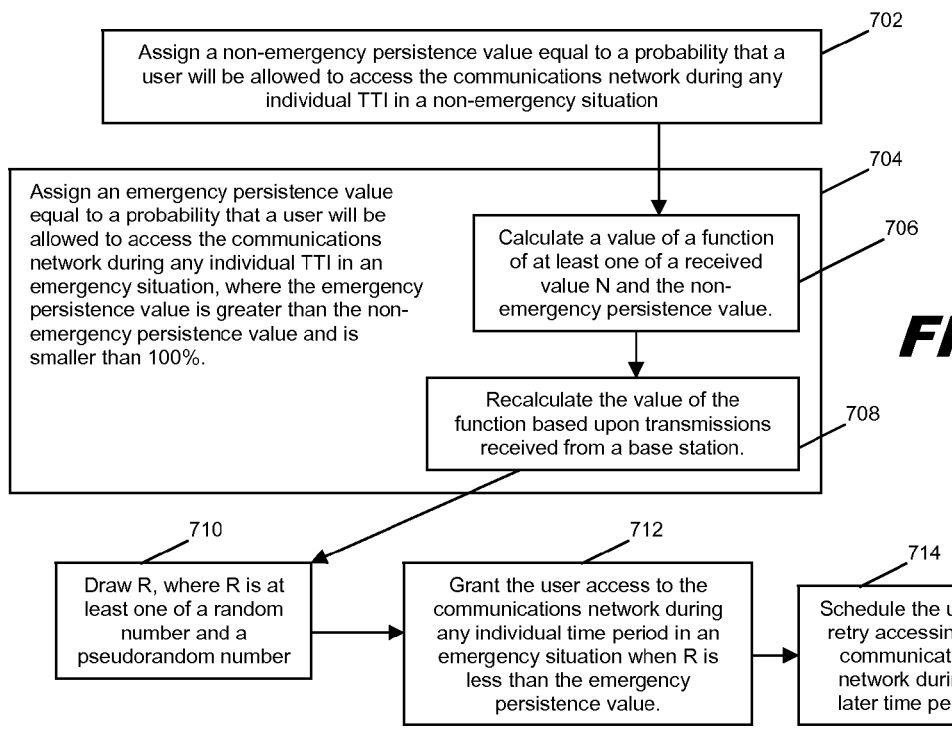
FIG. 7 is a block diagram in accordance with an embodiment.

FIG. 7 is a block diagram of an embodiment. At module 702, a non-emergency persistence value is assigned. The non-emergency persistence value is equal to a probability that a user will be allowed to access the communications network during any individual TTI in a non-emergency situation. At emergency module 704, an emergency persistence value is assigned. The emergency persistence value is equal to a probability that a user will be allowed to access the communications network during any individual TTI in an emergency situation, where the emergency persistence value is greater than the non-emergency persistence value and is smaller than 100%. At module 706, a value of a function of at least one of a received value N and the non-emergency persistence value is calculated. At module 708, the value of the function is recalculated based upon transmissions received from a base station.

At module 710, R is drawn. R is at least one of a random number and a pseudorandom number. R is compared with the persistence value ($P_0(N)$ if ASC=0 and $P_1(N)$ otherwise). At module 712, the user is granted access to the communications network during any individual time period in an emergency situation if R is less than the persistence value. At module 712, if the user is not granted access to the communication network during the individual time period, then another access attempt is schedule for a subsequent time period.

Throughout this discussion, expressions such as "is less than" or "is greater than" have been used in a strict sense. It may be noted that many similar embodiments are also possible in which "is less than" may be replaced with "is less than or equal to," and many embodiments are also possible in which "is greater than" is replaced with "is greater than or equal to."

Other Embodiments

In one embodiment, a method for reducing congestion in a communications network, the method comprises determining whether ASC=0. The method also comprises, if ASC=0, letting $P_0(N)$ be a monotonically decreasing function of the emergency services access parameter W, where the emergency services access parameter W may be a constant value (real number) that could have values comprised in the range [0, 1], such that $P_0(N)=1$ when the emergency services access parameter W=0 and such that $P_0(N)=P(N)$ when the emergency services access parameter W=1, where $P_1(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network. The emergency services access parameter W may be any value anywhere between zero and one, and need not equal exactly zero or one. If desired, the monotonically decreasing function of the emergency services access parameter W may be a linear function of the emergency services access parameter W, such as $P_0(N)=1-W+W*P(N)$, or may be a quadratic function of the emergency services access parameter W, such as $P_0(N)=1+(P(N)-1)*W^2$, or other function.

In one embodiment, an apparatus for reducing congestion in a communications network includes a pseudorandom number generator operative to generate a pseudorandom number. The apparatus also includes a persistence module operative to generate a persistence value ($P_0(N)$); and also includes a comparator operative to allow a user to access the communications network only if the pseudorandom number is less than the persistence value, wherein $P_0(N)$ can assume any values smaller than 1 and larger than P(N), where $P(N)=2^{-(N-1)}$ and where N is transmitted in a system information message.

If desired, the apparatus also includes a decision module operative to determine whether ASC=0. The persistence module may also be operative to calculate a first persistence value $P_0(N)$ if ASC=0, and a second persistence value P(N) less than the first persistence value otherwise, the first persistence value being a monotonically decreasing function of the emergency services access parameter W, where the emergency services access parameter W may be a constant value (real number) that could have values comprised in the range [0, 1], such that $P_0(N)=1$ when the emergency services access parameter W=0 and such that $P_0(N)=P(N)$ when the emergency services access parameter W=1, where $P(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network. The emergency services access parameter W may be any value anywhere between zero and one, and need not equal exactly zero or one. The monotonically decreasing function of the emergency services access parameter W may be a linear function of the emergency services access parameter W, such as $P_0(N)=1-W+W*P(N)$, or the monotonically decreasing function of the emergency services access parameter W may be a quadratic function of the emergency services access parameter W, such as $P_0(N)=1+(P(N)-1)*W^2$. Other monotonically decreasing functions of the emergency services access parameter W are also contemplated. Other apparatuses are also contemplated, some with other monotonically decreasing functions of the emergency services access parameter W.

In one embodiment, a computer program product is operative to cause a computer to reduce congestion in a communications network. The computer program product includes instructions operative to determine whether ASC=0. The computer program product also includes instructions operative when if ASC=0 to calculate $P_0(N)$ in accordance with a monotonically decreasing function of the emergency services access parameter W, where the emergency services access parameter W may be a constant value (real number) that could have values comprised in the range [0, 1], such that $P_0(N)=1$ when the emergency services access parameter W=0 and such that $P_0(N)=P(N)$ when the emergency services access parameter W=1, where $P(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network. The emergency services access parameter W may be any value anywhere between zero and one, and need not equal exactly zero or one.

If desired, the computer program product for causing a computer to reduce congestion in a communications network can be such that the monotonically decreasing function of the emergency services access parameter W is a linear function of the emergency services access parameter W, such as $P_0(N)=1-W+W*P(N)$, or the monotonically decreasing function of the emergency services access parameter W may be a quadratic function of the emergency services access parameter W, such as $P_0(N)=1+(P(N)-1)*W^2$. Other monotonically decreasing functions of the emergency services access parameter W are also contemplated. Other computer program products are contemplated, some with other monotonically decreasing functions of the emergency services access parameter W.

In one embodiment, an apparatus reduces congestion in a communications network. The apparatus includes pseudorandom number generator means operative to generate a pseudorandom number. The apparatus also includes persistence means operative to generate a persistence value ($P_0(N)$); and comparator means operative to allow a user to access the communications network only if the pseudorandom number is less than the persistence value, wherein $P_0(N)$ can assume any values smaller than 1 and larger than P(N), where $P(N)=2^{-(N-1)}$ and where N is transmitted in a system information message.

If desired, the apparatus also includes decision means operative to determine whether ASC=0. The apparatus may also be such that the persistence means is further operative to calculate a first persistence that $P_0(N)$ value if ASC=0, and a second persistence value P(N) less than the first persistence value otherwise, the first persistence value being a monotonically decreasing function of the emergency services access parameter W, where the emergency services access parameter W may be a constant value (real number) that could have values comprised in the range [0, 1], such that $P_0(N)=1$ when the emergency services access parameter W=0 and such that $P_0(N)=P(N)$ when the emergency services access parameter W=1, where $P(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network. The emergency services access parameter W may be any value anywhere between zero and one, and need not equal exactly zero or one.

If desired, the monotonically decreasing function of the emergency services access parameter W may be a linear function of the emergency services access parameter W, such as $P_0(N)=1-W+W*P(N)$, or the monotonically decreasing function of the emergency services access parameter W may be a quadratic function of the emergency services access parameter W, such as $P_0(N)=1+(P(N)-1)*W^2$. Other apparatuses, some with other monotonically decreasing function of the emergency services access parameter W, are also contemplated.

It can be seen that, in accordance with various embodiments of the present subject technology, the UE uses the access threshold value sent by the UMTS base station. The UE always uses the access threshold value included in the access authorization data, and use the value N sent in System Information Block 7 in all cases, even when ASC=0.

TDD and FDD

The method FIG. 2 can be applied to both frequency division duplex (FDD) and time division duplex (TDD). Both FDD and TDD modes of operation are specified in Rev99 of UMTS standards, and subsequent releases thereof, and both modes of operation are contemplated here. The value of at least one of the emergency services access parameters W, A, B, and α may be transmitted from the base station as part of a System Information Message ("SIM"), which may be sent on a Broadcast Control Channel ("BCCH"). If the System Information Message includes System Information Blocks, then all or part of the values of at least one of the emergency services access parameters W, A, B, α may be included in at least one of System Information Block 5 ("SIB5"), System Information Block 5bis ("SIB5bis"), System Information Block 7 ("SIB6"), and System Information Block 7 ("SIB7"). In one embodiment, a value of the emergency services access parameter W is provided whenever a value of N is provided.

It should be noted that the phrase "at least one of the emergency services access parameters W, A, B, and α" is to be interpreted as satisfied by the emergency services access parameter W, even in the absence of A, B, and α, and is also be interpreted as satisfied by the emergency services access parameter A, or by the emergency services access parameter B, or by the emergency services access parameters A and B together, even in the absence of the emergency services access parameter W and α. Similarly, "at least one of SIB5, SIB5bis, SIB6 and SIB7" would be satisfied if the emergency services access parameter W were provided in SIB5, without any such value being provided in SIB6 or SIB7, and would also be satisfied if the value were provided in both SIB5 and SIB6. In one embodiment, for example, a value of A and B are provided in SIB5, and updates to A and B are subsequently provided in SIB7 when determined by the base station. SIB7 is typically sent more often than SIB5, and it is more likely to be used for delta updates.

User equipment 10 that has established an active traffic channel connection with one or more Node Bs 20 is called active user equipment 10, and is said to be in a traffic state. User equipment 10 that is in the process of establishing an active traffic channel connection with one or more Node Bs 20 is said to be in a connection setup state. User equipment 10 may be any data device that communicates through a wireless channel or through a wired channel, for example using fiber optic or coaxial cables. The communication link through which the user equipment 10 sends signals to the Node B 20 is called a uplink. The communication link through which an NodeB 20 sends signals to a user equipment 10 is called a downlink.

Figure 8:
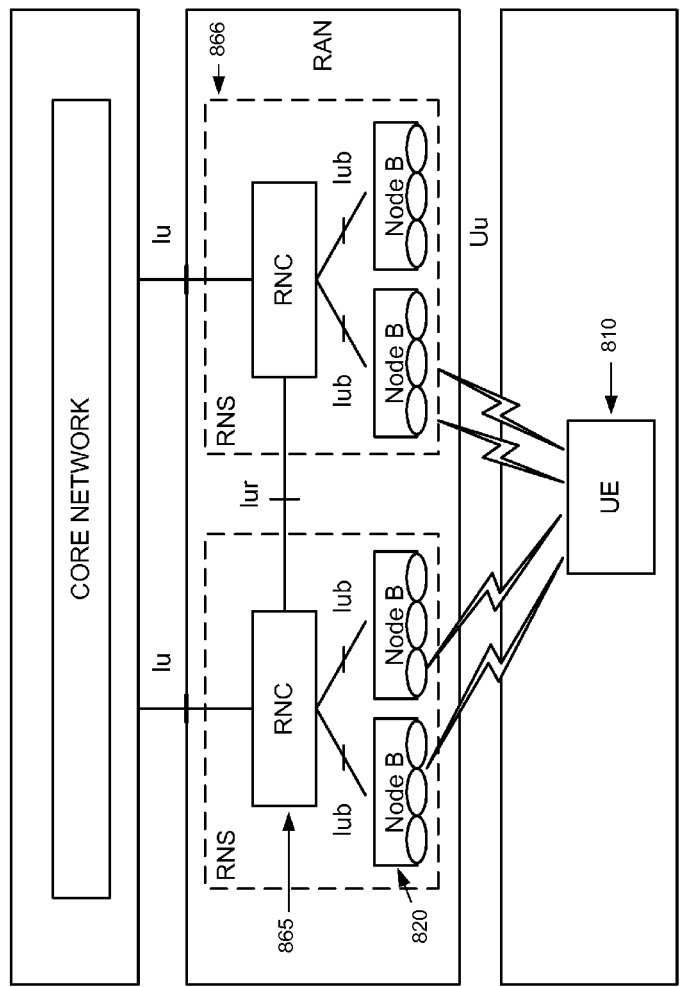
FIG. 8 and FIG. 9 are schematic diagrams showing a Node B and radio network controller interface with a packet network interface.
Figure 9:
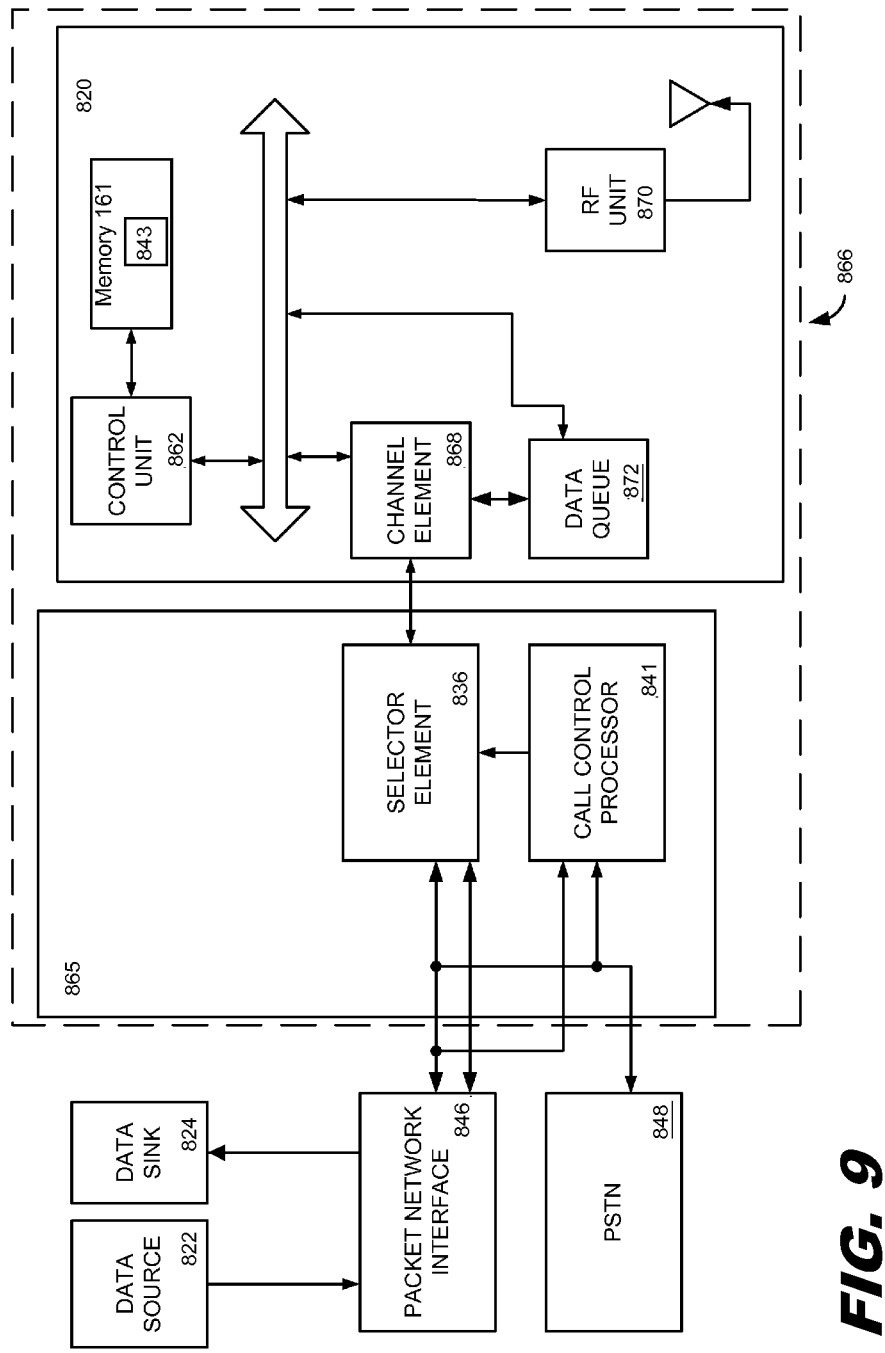

FIG. 8 and FIG. 9 are schematic diagrams showing a Node B 820 and radio network controller 865 interface with a packet network interface 846. The Node B 820 and radio network controller 865 may be part of a radio network server (RNS) 866, shown in FIG. 8 and in FIG. 9 as a dotted line surrounding one or more Node Bs 820 and the radio network controller 865. The associated quantity of data to be transmitted is retrieved from a data queue 872 in the Node B 820 and provided to the channel element 868 for transmission to the remote station 810 associated with the data queue 872.

Radio network controller 865 interfaces with packet network interface 846, Public Switched Telephone Network (PSTN) 848, and all Node Bs 820 in the communication system 800 (only one Node B 820 is shown in FIG. 9 for simplicity). Radio network controller 865 coordinates the communication between remote stations in the communication system and other users connected to packet network interface 846 and PSTN 848. PSTN 848 interfaces with users through a standard telephone network (not shown in FIG. 9).

Radio network controller 865 contains many selector elements 836, although only one is shown in FIG. 9 for simplicity. Each selector element 836 is assigned to control communication between one or more Node B's 820 and one remote station 810 (not shown in FIG. 9). If selector element 836 has not been assigned to a given user equipment 810, call control processor 841 is informed of the need to page the remote station. Call control processor 841 then directs Node B 820 to page the remote station 810.

Data source 822 contains a quantity of data, which is to be transmitted to a given remote station 810. Data source 822 provides the data to packet network interface 846. Packet network interface 846 receives the data and routes the data to the selector element 836. Selector element 836 then transmits the data to Node B 820 in communication with the target remote station 810. In the exemplary embodiment, each Node B 820 maintains a data queue 872, which stores the data to be transmitted to the remote station 810.

For each data packet, channel element 868 inserts the necessary control fields. In the exemplary embodiment, channel element 868 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 868 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 870 which quadrature modulates, filters, and amplifies the signal. The downlink signal is transmitted over the air through an antenna to the downlink.

At the user equipment 810, the downlink signal is received by an antenna and routed to a receiver. The receiver filters, amplifies, quadrature demodulates, and quantizes the signal. The digitized signal is provided to a demodulator (DEMOD), where it is despread with the short PNI and PNQ codes and decovered with the Walsh cover. The demodulated data is provided to a decoder which performs the inverse of the signal processing functions done at Node B 820, specifically the de-interleaving, decoding, and CRC check functions. The decoded data is provided to a data sink 824.

For example, as a user might not decode in the first attempt, all retransmissions may be stored to reattempt this user once other successful users have been cancelled. A large memory buffer may store up to 4 transmissions for 2 ms transmission time interval (TTI) enhanced users and 2 transmissions for 10 ms TTI enhanced users. (The transmission time interval (TTI) is the time interval for which the modulation, coding and spreading format is fixed). Additionally, dedicated 10 ms, 20 ms and 40 ms users may be supported by the method and apparatus disclosed in the present patent application. The present patent application will work with many different buffer sizes.

It is noted that a dedicated user was initially specified in Release 99, while an enhanced user on the uplink was specified in Release 6 of the 3GPP standards. The 3rd Generation Partnership Project (3GPP) is a collaboration agreement that was established in December 1998. It is a co-operation between ARIB/TTC (Japan), ETSI (Europe), ATIS (North America), CCSA (China) and TTA (South Korea). The scope of 3GPP is to make a third generation (3G) mobile phone system specification within the scope of the ITU's IMT-2000 project globally applicable. 3GPP specifications are based on evolved GSM specifications, which are generally known as the UMTS system. 3GPP standards are structured as Releases. Discussion of 3GPP thus frequently refers to the functionality in one release or another. For example, release 99 specifies the first UMTS 3G networks, incorporating a CDMA air interface. Release 6 integrates operation with Wireless LAN networks and adds High Speed Uplink Packet Access (HUSPA).

Data source 822 contains a quantity of data, which is to be transmitted to a given remote station 10. Data source 822 provides the data to packet network interface 846. Packet network interface 846 receives the data and routes the data to the selector element 836. Selector element 836 then transmits the data to Node B 820 in communication with the target remote station 10. In the exemplary embodiment, each Node B 820 maintains a data queue 872, which stores the data to be transmitted to the remote station 10.

For each data packet, channel element 868 inserts the necessary control fields. In the exemplary embodiment, channel element 868 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 868 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 870 which quadrature modulates, filters, and amplifies the signal. The downlink signal is transmitted over the air through an antenna to the downlink.

Figure 10:
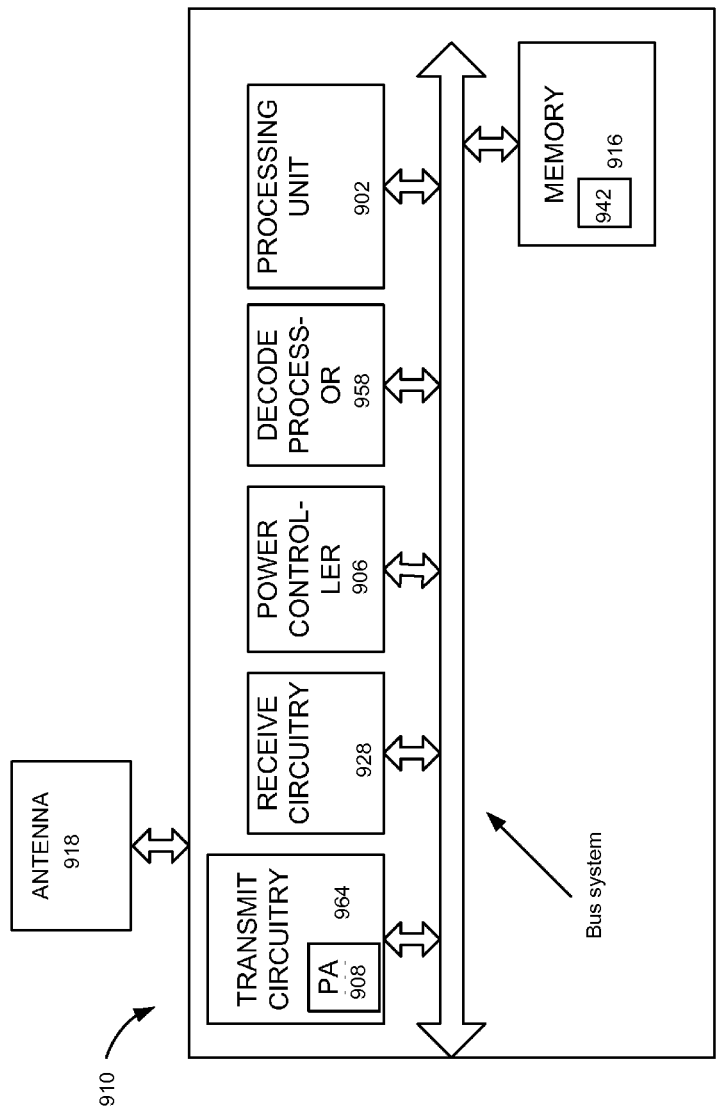
FIG. 10 illustrates an embodiment of a UE according to the present patent application in which the UE includes transmit circuitry, receive circuitry, throttle control, decode process unit, processing unit, and memory.

FIG. 10 illustrates an embodiment of a UE 910 that includes transmit circuitry 964 (including a power amplifier 908), receive circuitry 928, throttle control (also called power controller) 906, decode process unit 958, processing unit (also called decode processor or CPU) 902, and memory 916. A portion of the memory 916 may also include non-volatile random access memory (NVRAM) 942. The processing unit 902 controls operation of the UE 910. Memory 916, which may include both read-only memory (ROM) and random access memory (RAM), provides instructions and data to the processing unit 902.

The UE 910, which may be embodied in a wireless communication device such as a cellular telephone, may also include a housing that contains the transmit circuitry 964 and the receive circuitry 928 to allow transmission and reception of data, such as audio communications, between the UE 910 and a remote location. The transmit circuitry 964 and receive circuitry 928 may be coupled to an antenna 918.

The various components of the UE 910 are coupled together by a bus system which may include a power bus, a control signal bus, and a status signal bus in addition to a data bus. The UE 910 may also include a processing unit 902 for use in processing signals. Also shown are a power controller 906, a decode processor 958, and a power amplifier 908.

One or more exemplary embodiments described herein are set forth in the context of a digital wireless data communication system. While use within this context is advantageous, different embodiments of the present subject technology may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof In addition, the blocks shown in each block diagram may represent hardware or method steps.

Communication systems may use a single carrier frequency or multiple carrier frequencies. Each link may incorporate a different number of carrier frequencies. Furthermore, an access terminal 910 may be any data device that communicates through a wireless channel or through a wired channel, for example using fiber optic or coaxial cables. An access terminal 910 may be any of a number of types of devices including but not limited to PC card, compact flash, external or internal modem, or wireless or wireline phone. The access terminal 910 is also known as user equipment (UE), a remote station, a mobile station or a subscriber station. Also, the UE 10 may be mobile or stationary.

More specifically, various embodiments of the present subject technology may be incorporated in a wireless communication system operating in accordance with a communication standard outlined and disclosed in various standards published by the Telecommunication Industry Association (TIA) and other standards organizations. Such standards include the TWEIA-95 standard, TLtVEIA-IS-2000 standard, IMT-2000 standard, UMTS and WCDU standard, GSM standard, all incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (the emergency services access parameter W-CDMA) and other variants of CDMA such as TD-SCDMA. Further, CDMA2000covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user device. In the alternative, the processor and the storage medium may reside as discrete components in a user device. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or". Similarly, the phrase "at least one of A and B" is to be interpreted as satisfied by at least one of A, even in the absence of B, and is also be interpreted as satisfied by at least one of B, even in the absence of A; "at least one of A and B" is not to be interpreted as requiring both "at least one of A" and also "at least one of B." (Of course, the phrase "at least one of A and B" would also be satisfied in the presence of both at least one of A and also at least one of B.

While the exemplary embodiment discussed herein describes a CDMA system, various embodiments are applicable to any wireless per-user connection method. To effect efficient communications, the exemplary embodiment is described with respect to HDR, but may also be efficient in application to IS-95, the emergency services access parameter W-CDMA, IS-2000, GSM, TDMA, etc The various illustrative logical blocks, modules, circuits and algorithm steps described in connection with the embodiments disclosed herein may be implemented or performed as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. For example, some embodiments may be implemented to include a general purpose processor, a digital signal processor (DSP), an application specific integrated circuit (ASIC), a field programmable gate array (FPGA) or other programmable logic device, discrete gate or transistor logic, discrete hardware components such as, e.g., registers and First In First Out (FIFO) type, a processor executing a set of firmware instructions, any conventional programmable software module and a processor, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The software modules could reside in Random Access Memory (RAM), FLASH memory, Read Only Memory (ROM), Electrically Programmable ROM (EPROM) memory, Electrically Erasable Programmable ROM (EE- PROM), registers, hard disk, a removable disk, a Compact Disk-ROM (CD-ROM), or any other form of storage medium known in the art. The processor may reside in an ASIC (not shown). The ASIC processor may reside in a telephone (not shown), or may be implemented as a combination of a DSP and a microprocessor, or as two microprocessors in conjunction with a DSP core, etc.

A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present subject technology. In other words, unless a specific order of steps or actions is required for proper operation of the embodiment, the order and/or use of specific steps and/or actions may be modified without departing from the scope of the present subject technology.

Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof.

The previous description of the disclosed embodiments is provided to enable any person skilled in the art to make or use the present subject technology. Various modifications to these embodiments will be readily apparent to those skilled in the art, and the generic principles defined herein may be applied to other embodiments without departing from the spirit or scope of the present subject technology and without the use of the inventive faculty. Thus, the present subject technology is not intended to be limited to the embodiments shown herein but is to be accorded the widest scope consistent with the principles and novel features disclosed herein.

What is claimed is:

1. An apparatus for reducing congestion in a communications network, the apparatus comprising:
   a persistence module operative to generate a persistence value $P_0(N)$ for an emergency services access attempt
   a comparator operative to allow a user to access the communications network when a pseudorandom number is less than the persistence value, wherein $P_0(N)$ can assume any values smaller than or equal to 1 and larger than or equal to $P(N)$, where $P(N)$ is a persistence value for a non-emergency services access attempt; and
   a decision module operative to determine whether ASC=0;
   the persistence module being operative to calculate a first persistence $P_0(N)$ value when ASC=0, and a second persistence value $P(N)=P_1(N)$ that is less than the first persistence value otherwise, the first persistence value being a monotonically decreasing function of the emergency services access parameter W, where the emergency services access parameter W is a constant value (real number) that could have values anywhere in the range [0, 1] and need not be exactly 0 or 1, such that $P_0(N)=1$ when the emergency services access parameter W=0, and such that $P_0(N)=P_1(N)$ when the emergency services access parameter W=1, where $P_1(N)=2^{-(N-1)}$ and where N is transmitted in a system information message, the value of the emergency services access parameter W being selected results in a value of $P_0(N)$, such that the value $P_0(N)$ is a persistence value used to determine whether a user may access the communications network, wherein $P_0(N)=1-W+W*P(N)$.

2. The apparatus of claim 1, wherein:
the first value of the emergency services access parameter W is 0 and the second value of the emergency services access parameter W is 1.

3. The apparatus of claim 1, wherein:
the monotonically decreasing function of the emergency services access parameter W is a linear function of the emergency services access parameter W.

4. The apparatus of claim 3 wherein:
the value of the emergency services access parameter W is signaled on a Broadcast Control Channel (BCCH).

5. The apparatus of claim 1, wherein:
the function of the emergency services access parameter W is a monotonically decreasing quadratic function of the emergency services access parameter W.

6. The apparatus of claim 5, wherein:
the monotonically decreasing quadratic function of the emergency services access parameter W is $P_0(N)=1+(P(N)-1)*W^2$.

7. An apparatus for reducing congestion in a communications network, the apparatus comprising:
   a persistence module operative to generate a persistence value $P_0(N)$ for an emergency services access attempt;
   a comparator operative to allow a user to access the communications network when a pseudorandom number is less than the persistence value, wherein $P_0(N)$ can assume any values smaller than or equal to 1 and larger than or equal to $P(N)$, where $P(N)$ is a persistence value for a non-emergency services access attempt; and
   a decision module operative to determine whether ASC=0;
   wherein the persistence module is operative to calculate a first persistence value $P_0(N)$ if ASC=0, and a second persistence value $P(N)$ less than the first persistence value otherwise, the first persistence value being a function of a first emergency services access parameter A and a second emergency services access parameter B, such that the value $P_0(N)$ is a persistence value that is used to determine whether a user may access the communications network,
   wherein the function of the first emergency services access parameter A and the second emergency services access parameter B is $$P_0(N) = A + \left(B \frac{1}{2^{(N-1)}}\right).$$

8. An apparatus for reducing congestion in a communications network, the apparatus comprising:
   a persistence module operative to generate a persistence value $P_0(N)$ for an emergency services access attempt;
   a comparator operative to allow a user to access the communications network when a pseudorandom number is less than the persistence value, wherein $P_0(N)$ can assume any value smaller than or equal to 1 and larger than or equal to $P(N)$, where $P(N)$ is a persistence value for a non-emergency services access attempt and a decision module operative to determine whether ASC=0;
wherein the persistence module is operative to calculate a first persistence value $P_0(N)$ if ASC=0, and a second persistence value $P(N)$ less than the first persistence value otherwise, the first persistence value being a function of a first emergency services access parameter A and a second emergency services access parameter B and a third emergency services access parameter $\alpha$, such that the value $P_0(N)$ is a persistence value that is used to determine whether a user may access the communications network, wherein the function of the first emergency services access parameter A and the second emergency services access parameter B is $$P_0(N) = A + \left(B \frac{1}{2^{(N-1)}}\right)^\alpha.$$

9. A computer implemented method for reducing congestion in a communications network, the method comprising:
generating a persistence value $P_0(N)$ for an emergency services access attempt;
allowing a user to access the communications network when a pseudorandom number is less than the persistence value, wherein $P_0(N)$ can assume any values smaller than or equal to 1 and larger than or equal to $P(N)$, where $P(N)$ is a persistence value for a non-emergency services access attempt; and
determining whether ASC=0;
when ASC=0, letting $P_0(N)$ be a function of an emergency services access parameter W, where the emergency services access parameter W could have values comprised in the range between a first value and a second value, such that $P_0(N)=1$ when the emergency services access parameter W is the first value and such that $P_0(N)=P(N)$ when the emergency services access parameter W is the second value, where $P_1(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network, and
wherein $P_0(N)=1-W+W*P(N)$.

10. The method of claim 9, wherein:
the first value is 0 and the second value is 1.

11. The method for reducing congestion in a communications network in claim 9, wherein:
the function of the emergency services access parameter W is a monotonically decreasing function of the emergency services access parameter W.

12. The method for reducing congestion in a communications network in claim 9, wherein:
the function of the emergency services access parameter W is a linear function of the emergency services access parameter W.

13. The method for reducing congestion in a communications network in claim 9, wherein:
the function of the emergency services access parameter W is a quadratic function of the emergency services access parameter W.

14. The method for reducing congestion in a communications network in claim 9 wherein:
the value of the emergency services access parameter(s) is signaled on a Broadcast Control Channel (BCCH).

15. A computer-implemented method for reducing congestion in a communications network, the method comprising:
generating a persistence value $P_0(N)$ for an emergency services access attempt;
allowing a user to access the communications network when a pseudorandom number is less than the persistence value, wherein $P_0(N)$ can assume any values smaller than or equal to 1 and larger than or equal to $P(N)$, where $P(N)$ is a persistence value for a non-emergency services access attempt; and
determining whether ASC=0;
when ASC=0, letting $P_0(N)$ be a function of a first emergency services access parameter A and a second emergency services access parameter B, such that the value $P_0(N)$ is a persistence value that is used to determine whether a user may access the communications network,
wherein the function of the first emergency services access parameter A and the second emergency services access parameter B is $$P_0(N) = A + \left(B \frac{1}{2^{(N-1)}}\right).$$

16. A computer-implemented method for reducing congestion in a communications network, the method comprising:
generating a persistence value $P_0(N)$ for an emergency services access attempt;
allowing a user to access the communications network when a pseudorandom number is less than the persistence value, wherein $P_0(N)$ can assume any values smaller than or equal to 1 and larger than or equal to $P(N)$, where $P(N)$ is a persistence value for a non-emergency services access attempt; and
determining whether ASC=0;
when ASC=0, letting $P_0(N)$ be a function of a first emergency services access parameter A and a second emergency services access parameter B and a third emergency services parameter $\alpha$, such that the value $P_0(N)$ is a persistence value that is used to determine whether a user may access the communications network,
wherein the function of a first emergency services access parameter A and a second emergency services access parameter B is $$A + \left(B \frac{1}{2^{(N-1)}}\right)^\alpha.$$

17. A non-transitory computer program product for causing a computer to reduce congestion in a communications network, the computer program product comprising:
instructions operative to generate a persistence value $P_0(N)$ for an emergency services access attempt;
instructions operative to allow a user to access the communications network when a pseudorandom number is less than the persistence value, wherein $P_0(N)$ can assume any values smaller than or equal to 1 and larger than or equal to $P(N)$, where $P(N)$ is a persistence value for a non-emergency services access attempt; and
instructions operative to determine whether ASC=0; and
instructions operative when if ASC=0 to calculate $P_0(N)$ in accordance with a function of the emergency services access parameter W, such that $P_0(N)=1$ when the emergency services access parameter W is a first value, and such that $P_0(N)$ is a function of N equal to P(N) when the emergency services access parameter W a second value, wherein the value of the emergency services access parameter W is selected anywhere within a range from the first value to the second value and need not be exactly equal to the first value and need not be exactly equal to the second value, where $P_1(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network, and wherein $P_0(N)=1-W+W*P(N)$.

18. The computer program product of claim 17, wherein the function of the emergency services access parameter W is monotonically decreasing.

19. The computer program product of claim 17, wherein: the first value of the emergency services access parameter W is 0 and the second value of the emergency services access parameter W is 1.

20. An apparatus for reducing congestion in a communications network, the apparatus comprising:
persistence means operative to generate a persistence value $P_0(N)$ for an emergency services access attempt;
comparator means operative to allow a user to access the communications network when a pseudorandom number is less than the persistence value, wherein $P_0(N)$ can assume any values smaller than or equal to 1 and larger than or equal to P(N), where P(N) is a persistence value for a non-emergency services access attempt; and
decision means operative to determine whether ASC=0;
wherein the persistence module is operative to calculate a first persistence $P_0(N)$ value when ASC=0, and a second persistence value $P(N)=P_1(N)$ that is less than the first persistence value otherwise, the first persistence value being a monotonically decreasing function of the emergency services access parameter W, where the emergency services access parameter W is a constant value (real number) that could have values anywhere in the range [0, 1] and need not be exactly 0 or 1, such that $P_0(N)=1$ when the emergency services access parameter W=0, and such that $P_0(N)=P_1(N)$ when the emergency services access parameter W=1, where $P_1(N)=2^{-(N-1)}$ and where N is transmitted in a system information message, wherein the value of the emergency services access parameter W is selected which results in a value of $P_0(N)$, such that the value $P_0(N)$ is a persistence value that is used to determine whether a user may access the communications network, and wherein $P_0(N)=1-W+W*P(N)$.

21. The apparatus of claim 20, wherein:
the function of the emergency services access parameter W is a monotonically decreasing linear function of the emergency services access parameter W.

22. The apparatus of claim 20, wherein:
the function of the emergency services access parameter W is a monotonically decreasing quadratic function of the emergency services access parameter W.

23. A method for reducing congestion in a communications network, the method comprising:
determining whether an access service code equals zero, wherein when said access service code is equal to zero, then
reading a dynamic persistence value;
calculating a highest priority persistence value based on said dynamic persistence value;
generating a first pseudorandom number;
comparing said first pseudorandom number with said highest priority persistence value;
suspending an attempt to access the communication network when said first pseudorandom number is greater than or equal to said highest priority persistence value; and
transmitting a signal on the communications network when said first pseudorandom number is less than said highest priority persistence value,
wherein if said access service code is not equal to zero, then
reading a dynamic persistence value;
calculating a first persistence value based on said dynamic persistence value;
generating a second pseudorandom number;
comparing said second pseudorandom number with said first persistence value;
suspending an attempt to access the communication network when said second pseudorandom number is greater than or equal to said first persistence value; and
transmitting a signal on the communications network when said second pseudorandom number is less than said first persistence value, and
wherein the highest priority persistence value equals $$A + B\frac{1}{2^{(N-1)}},$$

where A is a first emergency services access parameter, B is a second emergency services access parameter and N is said dynamic persistence value.

24. The method for reducing congestion according to claim 23, wherein:
the first persistence value equals $2^{-(N-1)}$, where N is a system constant.

25. The method for reducing congestion according to claim 24, further comprising:
scaling said first persistence value.

26. The method for reducing congestion according to claim 23, wherein:
the highest persistence value is greater than the first persistence value to preserve priority for calls to emergency services.

27. A method for reducing congestion in a communications network, the method comprising:
determining whether an access service code equals zero, wherein when said access service code is equal to zero, then
reading a dynamic persistence value;
calculating a highest priority persistence value based on said dynamic persistence value;
generating a first pseudorandom number;
comparing said first pseudorandom number with said highest priority persistence value;
suspending an attempt to access the communication network when said first pseudorandom number is greater than or equal to said highest priority persistence value; and
transmitting a signal on the communications network when said first pseudorandom number is less than said highest priority persistence value,
wherein if said access service code is not equal to zero, then
reading a dynamic persistence value;

calculating a first persistence value based on said dynamic persistence value;

generating a second pseudorandom number;

comparing said second pseudorandom number with said first persistence value;

suspending an attempt to access the communication network if said second pseudorandom number is greater than or equal to said first persistence value; and transmitting a signal on the communications network if said pseudorandom number is less than said first persistence value, and the highest priority persistence value equals $$A + \left(B\frac{1}{2^{(N-1)}}\right)^{\alpha}$$

where A is a first emergency services access parameter, B is a second emergency services access parameter, $\alpha$ is a third emergency services access parameter and N is said dynamic persistence value.

28. The method for reducing congestion according to claim 27, wherein: the highest persistence value is greater than the first persistence value to preserve priority for calls to emergency services.

29. A method for reducing congestion in a communications network, the method comprising:

determining whether an access service code equals zero, wherein if said access service code is equal to zero, then reading a dynamic persistence value;

calculating a highest priority persistence value based on said dynamic persistence value;

generating a first pseudorandom number;

comparing said first pseudorandom number with said highest priority persistence value;

suspending an attempt to access the communication network when said first pseudorandom number is greater than or equal to said highest priority persistence value; and transmitting a signal on the communications network when said first pseudorandom number is less than said highest priority persistence value, wherein the highest priority persistence value equals $1-W+W*P(N)$, where W is an emergency services access parameter, and where N is a system constant.

* * * * *